(12) United States Patent
Tokita et al.

(10) Patent No.: US 11,370,206 B2
(45) Date of Patent: Jun. 28, 2022

(54) HIGH-HARDNESS MOLDING RESIN SHEET AND MOLDED ARTICLE USING SAME

(71) Applicants: MITSUBISHI GAS CHEMICAL COMPANY, INC., Tokyo (JP); MGC FILSHEET CO., LTD., Saitama (JP)

(72) Inventors: Atsuhiro Tokita, Osaka (JP); Masaki Hirabayashi, Osaka (JP); Masato Takasaki, Osaka (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 96 days.

(21) Appl. No.: 16/641,879

(22) PCT Filed: Aug. 27, 2018

(86) PCT No.: PCT/JP2018/031549
§ 371 (c)(1),
(2) Date: Feb. 25, 2020

(87) PCT Pub. No.: WO2019/049704
PCT Pub. Date: Mar. 14, 2019

(65) Prior Publication Data
US 2020/0247098 A1 Aug. 6, 2020

(30) Foreign Application Priority Data

Sep. 6, 2017 (JP) .............................. JP2017-171407

(51) Int. Cl.
*B32B 27/30* (2006.01)
*B32B 27/36* (2006.01)

(52) U.S. Cl.
CPC .......... *B32B 27/308* (2013.01); *B32B 27/302* (2013.01); *B32B 27/36* (2013.01); *B32B 2255/10* (2013.01); *B32B 2255/26* (2013.01); *B32B 2307/536* (2013.01); *B32B 2307/732* (2013.01)

(58) Field of Classification Search
CPC ............ B32B 2255/10; B32B 2255/26; B32B 2307/30; B32B 2307/536; B32B 2307/732; B32B 2307/738; B32B 27/08; B32B 27/281; B32B 27/30; B32B 27/302; B32B 27/308; B32B 27/36; B32B 27/365; B32B 7/027
See application file for complete search history.

(56) References Cited

U.S. PATENT DOCUMENTS

| | | | |
|---|---|---|---|
| 2009/0252935 A1 | 10/2009 | Koyama et al. | |
| 2011/0244242 A1 | 10/2011 | Oguro et al. | |
| 2015/0224748 A1 | 8/2015 | Onishi et al. | |

FOREIGN PATENT DOCUMENTS

| | | | |
|---|---|---|---|
| JP | 4-40183 | 7/1992 | |
| JP | 2001-334609 | 12/2001 | |
| JP | 2009-196153 | 9/2009 | |
| JP | 2009-234184 | 10/2009 | |
| JP | 2010-188719 | 9/2010 | |
| JP | 2010-284910 | 12/2010 | |
| JP | 2014-688 | 1/2014 | |
| JP | 2014-141088 | 8/2014 | |
| JP | 2014-141089 | 8/2014 | |
| JP | 2014-148165 | 8/2014 | |
| JP | 2014-180807 | 9/2014 | |
| JP | 2014-205342 | 10/2014 | |
| JP | 2015-104910 | 6/2015 | |
| JP | 2016-20052 | 2/2016 | |
| JP | 2016-534898 | 11/2016 | |
| WO | 2010/024217 | 3/2010 | |
| WO | 2014/046230 | 3/2014 | |
| WO | 2014/109373 | 7/2014 | |
| WO | WO-2014104334 A1 * | 7/2014 | ............. B29C 51/08 |

OTHER PUBLICATIONS

Machine translation of WO 2014/104334; Watanabe et al. (Year: 2014).*
Official Communication (ISR-210) issued in International Application No. PCT/JP2018/031549, dated Nov. 13, 2018.

* cited by examiner

*Primary Examiner* — Frances Tischler
(74) *Attorney, Agent, or Firm* — Greenblum & Bernstein, P.L.C.

(57) ABSTRACT

According to an embodiment, provided is a molding resin sheet including: a base material layer containing a polycarbonate resin (a1); a high-hardness resin layer containing a high-hardness resin; and a hard coat layer, wherein the high-hardness resin layer is located between the base material layer and the hard coat layer, the high-hardness resin has a pencil hardness of HB or more, and the glass transition points of the polycarbonate resin (a1) and the high-hardness resin satisfy the following relationship: $-10°\text{C} \leq$ (the glass transition point of the high-hardness resin)$-$(the glass transition point of the polycarbonate resin (a1))$\leq 40°\text{C}$.

10 Claims, No Drawings

HIGH-HARDNESS MOLDING RESIN SHEET AND MOLDED ARTICLE USING SAME

TECHNICAL FIELD

The present invention relates to a high-hardness molding resin sheet and a molded article using the same.

BACKGROUND ART

While a glass plate, a transparent resin plate or the like is used for automobile interior accessories such as a cover of an instrument panel or a component of a display for a household electric appliance, an office automation equipment, a personal computer, a small portable device or the like, a molded resin article is used for frame parts for holding the same. Meanwhile, a transparent sheet, especially a glass plate, attached onto frame parts made from an injection molded resin with a double-sided adhesive tape or the like is used as a component of a touchscreen display employed for a mobile phone terminal. The touchscreen display is preferably thinner in terms of response speed but a certain level of thickness is required in terms of strength and thus a highly elastic material is chosen. In addition, scratch resistance, easiness to wipe off fingerprints and the like are also requisite.

While a molded resin article for a use described above can be manufactured by molding a resin sheet, efforts have been made to earn characteristics that suit the use. For example, resin sheets are modified using a hard coat layer, a decorative sheet or the like; resin sheets are composed by laminating resin layers having different compositions; compositions of resins used have been devised; and else.

As the decorative sheet, for example, an acrylic resin can be used, which may also have a hard coat layer or be provided with a design by printing or the like and further laminated with a film.

For example, Patent document 1 discloses a decorative sheet that has a transparent acrylic resin sheet layer, a pattern printed ink layer, an ABS resin sheet layer and an ABS resin backer layer laminated sequentially from the surface side. Patent document 2 discloses a multilayer film that has a layer consisting of a methacrylic resin and acrylic rubber particles laminated on a surface of a polycarbonate resin layer, and discloses a decorative sheet obtained by providing decoration on one side of the multilayer film and laminating a thermoplastic resin sheet on the decorated surface. The document also discloses a decorated molded article manufactured by injection molding a thermoplastic resin on said decorated surface.

Patent document 3 discloses a molded resin article obtained by using a sheet that has a thermosetting hard coat layer or an ultraviolet-curable hard coat layer provided on a resin base material.

Moreover, Patent document 4 discloses a hard coat film for decoration that has a layer formed using a hard coat paint having a specific composition on one side of a base material film, where the base material film may be provided with a printed layer. This decorated film can be subjected to thermoforming. The decorated film described in Patent document 4 can be integrated with a molding resin to form a decorated molded article.

Patent document 5 discloses a laminate sheet that has a coating layer mainly composed of an acrylic resin on one side of a base material layer mainly composed of a polycarbonate-based resin composition.

Although various molding resin sheets or films have been proposed as described above, it is an endless issue to seek for a resin sheet or film for producing a molded resin article that has more suitable characteristics for the uses.

PRIOR ART DOCUMENTS

Patent Documents

Patent document 1: Japanese Unexamined Patent Application Publication No. 2001-334609
Patent document 2: Japanese Unexamined Patent Application Publication No. 2009-234184
Patent document 3: Japanese Examined Patent Application Publication No. H04-40183
Patent document 4: Japanese Unexamined Patent Application Publication No. 2010-284910
Patent document 5: Japanese Unexamined Patent Application Publication No. 2009-196153

SUMMARY OF THE INVENTION

Problems to be Solved by the Invention

In view of the above-described problems, there have been needs for a molding resin sheet that has characteristics such as high hardness and less likeliness to cause appearance abnormality upon molding, and a molded resin article using the same.

Means for Solving the Problems

The present inventors have gone through intensive studies for a molding resin sheet that contains a polycarbonate resin as a base material and that has a hard coat layer provided on its surface. As a result, the present inventors found that a molding resin sheet with high hardness which is less likely to cause appearance abnormality such as cracks, flow marks and the like upon molding can be achieved by providing a high-hardness resin layer between a polycarbonate resin layer and a hard coat layer, and also by selecting a polycarbonate resin and a high-hardness resin whose glass transition points satisfy a certain relationship. Specifically, the present invention is, for example, as follows.

[1] A molding resin sheet comprising:
a base material layer containing a polycarbonate resin (a1);
a high-hardness resin layer containing a high-hardness resin; and
a hard coat layer,
wherein the high-hardness resin layer is placed between the base material layer and the hard coat layer,
the pencil hardness of the high-hardness resin is HB or harder, and
the glass transition points of the polycarbonate resin (a1) and the high-hardness resin satisfy the following relationship:

−10° C.≤(Glass transition point of high-hardness resin)−(Glass transition point of polycarbonate resin (a1))≤40° C.

[1-1] A molding resin sheet comprising:
a base material layer containing a polycarbonate resin (a1);
a high-hardness resin layer containing a high-hardness resin, laminated on at least one side of the base material layer; and a hard coat layer laminated on the high-hardness resin layer,
wherein the pencil hardness of the high-hardness resin is HB or harder, and
the glass transition points of the polycarbonate resin (a1) and the high-hardness resin satisfy the following relationship:

−10° C.≤(Glass transition point of high-hardness resin)−(Glass transition point of polycarbonate resin (a1))≤40° C.

[2] The molding resin sheet according to [1], wherein the polycarbonate resin (a1) is an aromatic polycarbonate resin.
[3] The molding resin sheet according to [2], wherein the aromatic polycarbonate resin comprises a constituent unit represented by General formula (4a) below:

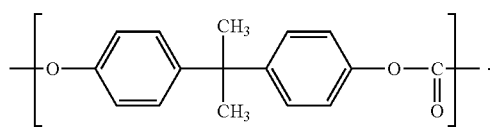
(4a)

[3-1] The molding resin sheet according to any one of [1]-[3], wherein the polycarbonate resin (a1) is a polycarbonate resin added with a monohydric phenol represented by General formula (4) below as a chain terminator:

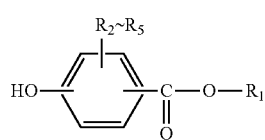
(4)

(wherein, $R_1$ represents a C8-C36 alkyl group or a C8-C36 alkenyl group; and $R_2$-$R_5$ each independently represent a hydrogen atom, a halogen or an optionally substituted C1-C20 alkyl group or C6-C12 aryl group, where the substituent is a halogen, a C1-C20 alkyl group or a C6-C12 aryl group).
[4] The molding resin sheet according to any one of [1]-[3], wherein the content of the polycarbonate resin (a1) is 75-100 mass % to the total mass of the base material layer.
[4-1] The molding resin sheet according to any one of [1]-[4], wherein the weight-average molecular weight of the polycarbonate resin (a1) is 15,000-75,000.
[4-2] The molding resin sheet according to any one of [1]-[4-1], wherein the glass transition point of the polycarbonate resin (a1) is 90-190° C.
[4-3] The molding resin sheet according to any one of [1]-[4-2], wherein the thickness of the base material layer is 0.3-10 mm.
[5] The molding resin sheet according to any one of [1]-[4], wherein the high-hardness resin is selected from the group consisting of the following resins (B1)-(B5):
  resin (B1): a copolymer containing a (meth)acrylic ester constituent unit (a) represented by General formula (1) below and an aliphatic vinyl constituent unit (b) represented by General formula (2) below, or an alloy of said copolymer and a resin (B2):

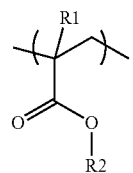
(1)

(wherein, R1 is a hydrogen atom or a methyl group; and R2 is a C1-C18 alkyl group)

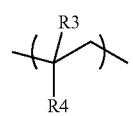
(2)

(wherein, R3 is a hydrogen atom or a methyl group; and R4 is a cyclohexyl group optionally substituted with a C1-C4 hydrocarbon group);
  resin (B2): a copolymer (D) containing 6-77 mass % (meth)acrylic ester constituent unit, 15-71 mass % styrene constituent unit and 8-23 mass % unsaturated dicarboxylic acid constituent unit, an alloy of said copolymers (D), or an alloy of said copolymer (D) and other high-hardness resin;
  resin (B3): a copolymer containing a constituent unit (c) represented by General formula (6) below, and optionally a constituent unit (d) represented by General formula (7) below:

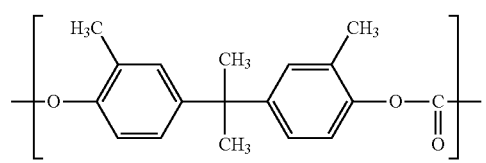
(6)

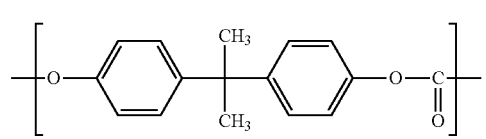
(7)

resin (B4): a copolymer (G) containing 5-20 mass % styrene constituent unit, 60-90 mass % (meth)acrylic ester constituent unit and 5-20 mass % N-substituted maleimide constituent unit, or an alloy of said copolymer (G) and said resin (B2); and
  resin (B5): a resin containing a constituent unit (e) represented by General formula (8) below:

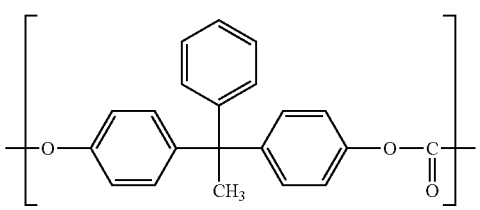
(8)

[5-1] The molding resin sheet according to [5], wherein the high-hardness resin is the resin (B1) and the glass transition point of the resin (B1) is 110-140° C.
[5-2] The molding resin sheet according to either one of [5] and [5-1], wherein the high-hardness resin is the resin (B1) and the weight-average molecular weight of the resin (B1) is 50,000-400,000.
[5-3] The molding resin sheet according to any one of [5]-[5-2], wherein the high-hardness resin is the resin (B1), the content of the (meth)acrylic ester constituent unit (a) represented by General formula (1) is 65-80 mol % with respect to all constituent units of the resin (B1), and the content of the aliphatic vinyl constituent unit (b) represented by General formula (2) is 20-35 mol % with respect to all constituent units of the resin (B1).
[5-4] The molding resin sheet according to any one of [5]-[5-3], wherein the high-hardness resin is the resin (B1), and the polycarbonate resin (a1) is polycarbonate resin containing the constituent unit of General formula (4a).
[5-5] The molding resin sheet according to [5], wherein the high-hardness resin is the resin (B2), and the glass transition point of the resin (B2) is 90-150° C.
[5-6] The molding resin sheet according to either one of [5] and [5-5], wherein the high-hardness resin is the resin (B2), and other high-hardness resin in the resin (B2) is selected from the group consisting of a methyl methacrylate-styrene copolymer, polymethyl methacrylate, and an acrylonitrile-butadiene-styrene copolymer.
[5-7] The molding resin sheet according to [5], [5-5] and [5-6], wherein the high-hardness resin is the resin (B2), and the weight-average molecular weight of the resin (B2) is 50,000-300,000.
[5-8] The molding resin sheet according to [5] and [5-5]-[5-7], wherein the high-hardness resin is the resin (B2), and the polycarbonate resin (a1) is a polycarbonate resin containing the constituent unit of General formula (4a).
[5-9] The molding resin sheet according to [5], wherein the high-hardness resin is the resin (B3), the ratio of the constituent unit (c) is 50-100 mol % with respect to all constituent units of the resin (B3), and the ratio of the constituent unit (d) is 0-50 mol %.
[5-10] The molding resin sheet according to either one of [5] and [5-9], wherein the high-hardness resin is the resin (B3), and the weight-average molecular weight of the resin (B3) is 15,000-75,000.
[5-11] The molding resin sheet according to any one of [5], [5-9] and [5-10], wherein the high-hardness resin is the resin (B3), and the glass transition point of the resin (B3) is 105-150° C.
[5-12] The molding resin sheet according to any one of [5] and [5-9]-[5-11], wherein the high-hardness resin is the resin (B3), and the polycarbonate resin (a1) is a polycarbonate resin containing the constituent unit of General formula (4a).
[5-13] The molding resin sheet according to [5], wherein the high-hardness resin is the resin (B4), and the weight-average molecular weight of the resin (B4) is 50,000-250,000.
[5-14] The molding resin sheet according to either one of [5] and [5-13], wherein the high-hardness resin is the resin (B4), and the glass transition point of the resin (B4) is 110-150° C.
[5-15] The molding resin sheet according to any one of [5], [5-13] and [5-14], wherein the high-hardness resin is the resin (B4), and the polycarbonate resin (a1) is a polycarbonate resin containing the constituent unit of General formula (4a).
[5-16] The molding resin sheet according to [5], wherein the high-hardness resin is the resin (B5), and the ratio of the constituent unit (e) is 80-100 mol % with respect to all constituent units of the resin (B5).
[5-17] The molding resin sheet according to either one of [5] and [5-16], wherein the high-hardness resin is the resin (B5), and the weight-average molecular weight of the resin (B5) is 10,000-1,000,000.
[5-18] The molding resin sheet according to any one of [5], [5-16] and [5-17], wherein the high-hardness resin is the resin (B5), and the glass transition point of the resin (B5) is 120-200° C.
[5-19] The molding resin sheet according to any one of [5] and [5-16]-[5-18], wherein the high-hardness resin is the resin (B5), and the polycarbonate resin (a1) is a polycarbonate resin containing the constituent unit of General formula (4a).
[6] The molding resin sheet according to any one of [1]-[5], wherein the content of the high-hardness resin is 70-100 mass % to the total mass of the high-hardness resin layer.
[6-1] The molding resin sheet according to any one of [1]-[6], wherein the thickness of the high-hardness resin layer is 10-250 μm.
[7] The molding resin sheet according to any one of [1]-[6-1], wherein the total thickness of the base material layer and the high-hardness resin layer is 0.5 mm-3.5 mm.
[8] The molding resin sheet according to any one of [1]-[7], wherein the ratio of the thickness of the base material layer is 75%-99% to the total thickness of the base material layer and the high-hardness resin layer.
[9] The molding resin sheet according to any one of [1]-[8], wherein the hard coat layer is an acrylic hard coat.
[10] The molding resin sheet according to any one of [1]-[9], wherein the pencil hardness of the surface of the hard coat layer of the molding resin sheet is 2H or harder.
[11] A molded resin article molded using the molding resin sheet according to any one of [1]-[10].

Advantageous Effect of the Invention

The present invention can provide a molding resin sheet that has characteristics such as high hardness and less likeliness to cause appearance abnormality upon molding, and a molded resin article using the same.

EMBODIMENTS FOR CARRYING OUT THE INVENTION

Hereinafter, embodiments of the present invention will be illustrated in detail by way of production examples and examples, although the present invention should not be limited to the illustrated production examples, examples and the like, and can be carried out by altering the method within a range that does not greatly depart from the scope of the present invention.

A molding resin sheet of an embodiment (hereinafter, often simply referred to as a "resin sheet") comprises a base material layer containing a polycarbonate resin (a1), a high-hardness resin layer containing a high-hardness resin and a hard coat layer, wherein the high-hardness resin layer is placed between the base material layer and the hard coat layer. An additional layer may be provided between the base material layer and the high-hardness resin layer, or between the high-hardness resin layer and the hard coat layer. Examples of the additional layer include, but not limited to, an adhesive layer and a primer layer. While the additional layer may or may not be provided, one embodiment provides a resin sheet comprising a base material layer containing a polycarbonate resin (a1), a high-hardness resin layer laminated on at least one side of the base material layer, and a hard coat layer laminated on the high-hardness resin layer.

The high-hardness resin layer and the hard coat layer can be provided on at least one side of base material layer, and the structure of the other side is not particularly limited. Alternatively, the high-hardness resin layers may be provided on both sides of the base material layer, in which case the hard coat layer may be provided on either or both of the high-hardness resin layers. When high-hardness resin layers are to be provided on both sides of the base material layer, a same high-hardness resin is preferably used for the two high-hardness resin layers so as to have a stable resin sheet with less warping.

A molding resin sheet according to an embodiment is provided with a high-hardness resin layer between a base material layer and a hard coat layer as described above, where the glass transition points of the polycarbonate resin (a1) in the base material layer and the high-hardness resin in the high-hardness resin layer satisfy a certain relationship such that the molding resin sheet has high hardness and is less likely to cause appearance abnormality such as cracks, flow marks and the like upon molding. In particular, since such a resin sheet is less likely to cause appearance abnormality upon thermoforming and allows a wider range of conditions upon thermoforming (temperature, heating time, etc.), the resin sheet can be said to be adaptable for thermoforming.

A resin sheet that has a hard coat layer with high hardness formed on its surface like the above-described embodiment, especially, a resin sheet that uses a polycarbonate resin as the base material, has excellent shock resistance, is highly safe and weighs light as compared to a general glass plate. In addition, it is easier to bend than a general glass plate, and does not break by a little bending. This is presumably because the hard coat layer of the resin sheet has certain flexibility.

The hardness of the resin sheet can further be enhanced by providing a high-hardness resin layer between the base material layer and the hard coat layer. If the hard coat layer is provided directly on the polycarbonate resin layer, the elastic modulus may be low and buckling is likely to be caused, but such a problem can be solved by providing the high-hardness resin layer.

The glass transition points of the polycarbonate resin (a1) in the base material layer and the high-hardness resin in the high-hardness resin layer satisfy the following relationship.

$$-10° C. \leq (\text{Glass transition point of high-hardness resin}) - (\text{Glass transition point of polycarbonate resin } (a1)) \leq 40° C.$$

Conventionally, when a hard coat layer is provided on a laminate of different types of resin layers, there is a problem of difficulty in thermoforming without causing defects such as cracks since the glass transition point (Tg) and the melt viscosity of the resin contained in each layer differ. According to the above-described embodiment, however, use of a polycarbonate resin (a1) and a high-hardness resin that satisfy the above-mentioned relationship can solve such problems as well.

When a multilayer resin sheet needs to be thermoformed into a desired shape, molding is usually carried out at a molding temperature of the resin that is most abundant in the layer. For example, in a case of a resin sheet that uses a polycarbonate resin as the base material layer, a polycarbonate resin with good shock resistance is usually most abundant, and thus thermoforming is carried out at a molding temperature adapted for the polycarbonate resin. Since the resin sheet according to the embodiment uses a polycarbonate resin (a1) and a high-hardness resin that satisfy the above-mentioned relationship, the problem of appearance abnormality is unlikely to occur even when thermoforming is carried out at a molding temperature adapted for the polycarbonate resin. Accordingly, the resin sheet according to the embodiment is more suitable for thermoforming than conventional resin sheets.

The glass transition points of the polycarbonate resin (a1) and the high-hardness resin are preferably $-5° C. \leq (\text{Glass transition point of high-hardness resin}) - (\text{Glass transition point of polycarbonate resin } (a1)) \leq 30° C.$, and more preferably $0° C. \leq (\text{Glass transition point of high-hardness resin}) - (\text{Glass transition point of polycarbonate resin } (a1)) \leq 30° C.$ If the Tg of the high-hardness resin is exceedingly lower than the Tg of the polycarbonate resin (a1), the high-hardness resin becomes rubbery or molten and thus moves easily upon thermoforming. In such a case, the hard coat layer that has a highly crosslinked structure and that remains hard even under heating cannot trace the movement of the high-hardness resin and thus likely to crack. Meanwhile, if the Tg of the high-hardness resin is too high as compared to the Tg of the polycarbonate resin (a1), difference in viscosity between the high-hardness resin and the polycarbonate resin becomes too large, and the interface between them becomes rough upon lamination, which may cause flow marks.

The resin sheet according to the embodiment can favorably be used for producing a molded article with a curved shape that requires hardness. For example, since a component having a bent part continuous with a flat part can properly be produced, products with a novel design and functions can be provided.

When a conventional resin sheet is used for producing a molded article having the above-described shape, defects such as cracks are frequently caused upon thermoforming by heat press molding, vacuum molding, pressure molding, TOM molding or the like. Accordingly, in order to suppress occurrence of cracks upon thermoforming, efforts such as reduction of the hardness of the hard coat are required. While reduction of the hardness of the hard coat enhances thermoforming property, it raises yet other problems where the hard coat may easily be damaged due to its softness or the chemical resistance may be deteriorated.

On the other hand, since occurrence of cracks can be suppressed as described above, the above-described embodiment can provide a resin sheet that is thermoformable without reducing the hardness of the hard coat. The resin sheet according to the embodiment can be provided with a hard coat layer on its surface and therefore is less likely to be damaged and highly chemical resistant. By making use of such characteristics, the resin sheet according to the embodiment can be used as a component of a display of a personal computer, a mobile phone or the like, as an automobile exterior or interior member, or a housing or a front panel having curved-surface for a mobile phone terminal, a personal computer, a tablet computer, an automobile navigation or the like.

Hereinafter, each of the components of the resin sheet according to the embodiment will be described.

1. Base Material Layer

A base material layer is a resin layer mainly containing a polycarbonate resin (a1). One or more types of polycarbonate resins (a1) may be contained in the base material layer. The content of the polycarbonate resin (a1) contained in the base material layer is preferably 75 mass % or more, more preferably 90 mass % or more and particularly preferably 100 mass % to the total mass of the base material layer.

Increase in the content of the polycarbonate resin can enhance the shock resistance.

While the polycarbonate resin (a1) is not particularly limited as long as it contains a carbonate ester bond, i.e., a —[O—R—OCO]— unit (where, R may include either or both of aliphatic and aromatic groups in a linear or branched structure), in the main chain of the molecule, it is preferably an aromatic polycarbonate resin, and particularly preferably a polycarbonate resin containing a constituent unit of Formula (4a) below. Use of such a polycarbonate resin can give a resin sheet with higher shock resistance.

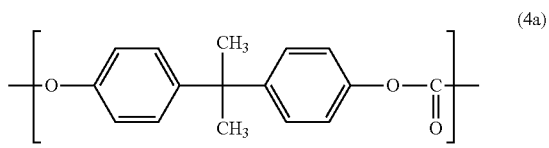

(4a)

Specifically, as the polycarbonate resin (a1), an aromatic polycarbonate resin (for example, Iupilon S-2000, Iupilon S-1000 or Iupilon E-2000; manufactured by Mitsubishi Engineering-Plastics Corporation) or the like may be used.

Recently, a polycarbonate resin added with a monohydric phenol such as one represented by General formula (4) below has been used as a chain terminator for the purpose of controlling the glass transition point of the polycarbonate resin. A polycarbonate resin added with a chain terminator like that can also be used in the above-described embodiment.

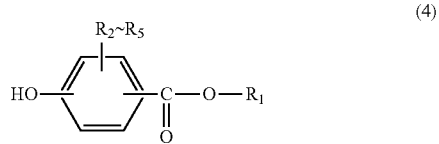

(4)

(wherein, $R_1$ represents a C8-C36 alkyl group or a C8-C36 alkenyl group; $R_2$-$R_5$ each independently represent a hydrogen atom, a halogen or an optionally substituted C1-C20 alkyl or C6-C12 aryl group, where the substituent is a halogen, a C1-C20 alkyl group or a C6-C12 aryl group).

Herein, an "alkyl group" or an "alkenyl group" may either be linear or branched and may or may not be substituted.

More preferably, the monohydric phenol represented by General formula (4) is represented by General formula (5) below.

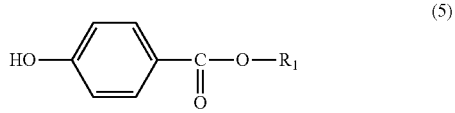

(5)

(wherein, $R_1$ represents a C8-C36 alkyl group or a C8-C36 alkenyl group).

More preferably, the number of carbons of $R_1$ in General formula (4) or (5) is preferably in a specific numerical range. Specifically, the upper limit number of carbons of $R_1$ is preferably 36, more preferably 22 and particularly preferably 18. The lower limit number of carbons of $R_1$ is preferably 8 and more preferably 12.

Among the monohydric phenols represented by General formulae (4) and (5), either or both of para-hydroxybenzoic acid hexadecyl ester and para-hydroxybenzoic acid 2-hexyldecyl ester are particularly preferably used as the chain terminator.

For example, if a monohydric phenol represented by General formula (5) (wherein $R_1$ is a C16 alkyl group) is used as the chain terminator, a polycarbonate resin excellent in glass transition temperature, melt fluidity, moldability, drawdown resistance and the like can be achieved. This is also particularly preferable in that the solvent solubility of the monohydric phenol upon polycarbonate resin production will be excellent.

On the other hand, if the number of carbons of $R_1$ in General formula (4) or (5) is too large, the solubility of the monohydric phenol (chain terminator) in an organic solvent tends to deteriorate, which may result in poor productivity in producing the polycarbonate resin.

For example, if the carbon number of $R_1$ is 36 or less, the productivity in producing the polycarbonate resin would be high and thus economic. If the carbon number of $R_1$ is 22 or less, the monohydric phenol would have particularly excellent solubility in an organic solvent and very high productivity in producing the polycarbonate resin, and thus is highly economic. An example of a polycarbonate resin using such a monohydric phenol includes Iupizeta T-1380 (manufactured by Mitsubishi Gas Chemical).

If the number of carbons of $R_1$ in General formula (4) or (5) is too small, the glass transition point of the polycarbonate resin would not be sufficiently low and the thermoforming property may be deteriorated.

The weight-average molecular weight of the polycarbonate resin (a1) affects the shock resistance and the molding conditions of the resin sheet. Specifically, if the weight-average molecular weight is too small, the shock resistance of the resin sheet may be deteriorated. If the weight-average molecular weight is too large, an excessive heat source may be required upon forming the base material layer that contains the polycarbonate resin (a1). Moreover, since a high temperature may be required depending on the selected molding process, the polycarbonate resin (a1) may be exposed to a high temperature, which may adversely affect the heat stability. The weight-average molecular weight of the polycarbonate resin (a1) is preferably 15,000-75,000, more preferably 20,000-70,000 and still more preferably 20,000-65,000. Herein, a weight-average molecular weight refers to a weight-average molecular weight determined by gel permeation chromatography (GPC) in terms of polystyrene standards.

Among the known polycarbonate resins, those skilled in the art would appropriately select and use a polycarbonate resin (a1) that has Tg satisfying the above-mentioned relationship by considering the glass transition point (Tg) of the high-hardness resin to be used. The Tg of the polycarbonate resin (a1) is preferably 90-190° C., more preferably 100-170° C. and particularly preferably 110-150° C. Herein, a glass transition point refers to a temperature that can be calculated by subjecting 10 mg of a sample to a midpoint method using a differential scanning calorimeter at a temperature rising rate of 10° C./min.

In addition to the polycarbonate resin (a1), the base material layer may contain other resin. Examples of such a resin include polyester resins. While the polyester resin preferably mainly contains terephthalic acid as a dicarboxylic acid component, it may also contain a dicarboxylic acid component other than terephthalic acid.

For example, a polyester resin (so-called "PETG") resulting from polycondensation of a glycol component containing 20-40 mol % 1,4-cyclohexane dimethanol to 80-60 mol % ethylene glycol as the main component (total of 100 mol %) is favorable. While the resin of the base material layer is preferably the polycarbonate resin (a1) alone, if other resin is to be contained, the amount thereof is preferably 0-50 mass %, more preferably 0-30 mass % and particularly preferably 0-20 mass % to the total mass of the base material layer.

The base material layer may further contain an additive and the like. Such an additive may be those that are generally used in a resin sheet. Examples of such an additive include an antioxidant, a coloring preventing agent, an antistatic agent, a mold release agent, a lubricant, a dye, a pigment, a plasticizer, a flame retardant, a resin modifier, a compatibilizing agent and a reinforcing material such as an organic filler or an inorganic filler. A method for blending such an additive and the resin is not particularly limited, and it may be a method of compounding the whole, a method of dry blending the masterbatch, a method of dry blending the whole, or the like. The amount of the additive is preferably 0-10 mass %, more preferably 0-7 mass % and particularly preferably 0-5 mass % to the total mass of the base material layer.

The thickness of the base material layer is preferably 0.3-10 mm, more preferably 0.3-5 mm and particularly preferably 0.3-3.5 mm.

2. High-Hardness Resin Layer

The high-hardness resin layer is a resin layer mainly containing a high-hardness resin. Herein, a high-hardness resin refers to a resin having hardness higher than that of the polycarbonate resin, i.e., the base material, and having a pencil hardness of HB or harder. The pencil hardness of the high-hardness resin is preferably HB-3H, more preferably H-3H and particularly preferably 2H-3H. One or more types of high-hardness resins may be contained in the high-hardness resin layer. Among the known high-hardness resins, those skilled in the art would appropriately select and use a high-hardness resin that has Tg satisfying the relationship "−10° C.≤(Glass transition point of high-hardness resin)−(Glass transition point of polycarbonate resin (a1)) ≤40° C." by considering the glass transition point (Tg) of the polycarbonate resin to be used. The high-hardness resin is preferably selected from at least one of the following resins (B1)-(B5).

<Resin (B1)>

A resin (B1) is a copolymer containing a (meth)acrylic ester constituent unit (a) represented by General formula (1) below and an aliphatic vinyl constituent unit (b) represented by General formula (2) below, or an alloy of said copolymer and a resin (B2) described below.

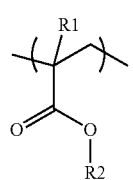

(1)

(wherein, R1 represents a hydrogen atom or a methyl group; and R2 represents a C1-C18 alkyl group)

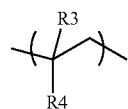

(2)

(wherein, R3 represents a hydrogen atom or a methyl group; and R4 represents a cyclohexyl group optionally substituted with a C1-C4 hydrocarbon group)

Herein, a "hydrocarbon group" may be linear, branched or cyclic and may or may not be substituted.

R2 in the (meth)acrylic ester constituent unit (a) represented by General formula (1) is a C1-C18 alkyl group, preferably a C1-C10 alkyl group and more preferably a C1-C6 alkyl group. Specific examples include a methyl group, an ethyl group, a butyl group, a lauryl group, a stearyl group, a cyclohexyl group and an isobornyl group. These alkyl groups may or may not be substituted.

Among the (meth)acrylic ester constituent units (a), a (meth)acrylic ester constituent unit in which R2 is a methyl group or an ethyl group is preferable, and a methyl methacrylate constituent unit in which R1 is a methyl group and R2 is a methyl group is more preferable.

R3 in the aliphatic vinyl constituent unit (b) represented by General formula (2) is a hydrogen atom or a methyl group and more preferably a hydrogen atom. R4 is a cyclohexyl group or a cyclohexyl group substituted with a C1-C4 hydrocarbon group, and preferably an unsubstituted cyclohexyl group.

Accordingly, among the aliphatic vinyl constituent units (b), an aliphatic vinyl constituent unit in which R3 is a hydrogen atom and R4 is a cyclohexyl group is more favorable.

The resin (B1) may contain one or more types of (meth) acrylic ester constituent units (a), and one or more types of aliphatic vinyl constituent units (b).

The total content of the (meth)acrylic ester constituent unit (a) and the aliphatic vinyl constituent unit (b) is preferably 90-100 mol %, more preferably 95-100 mol % and particularly preferably 98-100 mol % with respect to all constituent units of the resin (B1).

Specifically, the resin (B1) may contain a constituent unit other than the (meth)acrylic ester constituent unit (a) and the aliphatic vinyl constituent unit (b). The amount of such a constituent unit is preferably 10 mol % or less, more preferably 5 mol % or less and particularly preferably 2 mol % or less with respect to all constituent units of the resin (B1).

An example of the constituent unit other than the (meth) acrylic ester constituent unit (a) and the aliphatic vinyl constituent unit (b) includes a constituent unit originating from an aromatic vinyl monomer including non-hydrogenated aromatic double bonds, which is generated upon producing a resin (B1) by polymerizing a (meth)acrylic ester monomer and an aromatic vinyl monomer and thereafter hydrogenating aromatic double bonds of the aromatic vinyl monomer.

Furthermore, the content of the (meth)acrylic ester constituent unit (a) represented by General formula (1) is preferably 65-80 mol % and more preferably 70-80 mol % with respect to all constituent units of the resin (B1). If the ratio of the (meth)acrylic ester constituent unit (a) with respect to all constituent units of the resin (B1) is 65 mol % or more, a resin layer excellent in adhesiveness with the base material layer and excellent in surface hardness can be obtained. If the ratio is 80 mol % or less, warping of the resin sheet due to water absorption is less likely to occur.

Furthermore, the content of the aliphatic vinyl constituent unit (b) represented by General formula (2) is preferably 20-35 mol % and more preferably 20-30 mol % with respect to all constituent units of the resin (B1). A content of the aliphatic vinyl constituent unit (b) of 20 mol % or more can prevent warping in a high temperature and high humidity environment and a content of 35 mol % or less can prevent peeling at the interface with the base material.

Herein, a "copolymer" may have any of a random, block or alternating copolymer structure.

While a method for producing the resin (B1) is not particularly limited, the resin (B1) is preferably obtained by polymerizing at least one type of (meth)acrylic ester monomer and at least one type of aromatic vinyl monomer, and thereafter hydrogenating aromatic double bonds originating from the aromatic vinyl monomer. Herein, (meth)acrylic acid refers to methacrylic acid and/or acrylic acid.

Specific examples of the aromatic vinyl monomer used for this include styrene, α-methylstyrene, p-hydroxystyrene, alkoxystyrene, chlorostyrene and derivatives thereof. Among them, styrene is preferable.

The (meth)acrylic ester monomer and the aromatic vinyl monomer can be polymerized by a known method such as bulk polymerization, solution polymerization or the like.

Bulk polymerization is carried out by continuously supplying a monomer composition containing the above-mentioned monomers and a polymerization initiator into a completely stirred tank reactor so as to allow continuous polymerization at 100-180° C. If necessary, the above-described monomer composition may contain a chain transfer agent.

Examples of the polymerization initiator include, but not particularly limited to, organic peroxides such as t-amylperoxy-2-ethylhexanoate, t-butylperoxy-2-ethylhexanoate, benzoyl peroxide, 1,1-di(t-hexylperoxy)-3,3,5-trimethylcyclohexane, 1,1-di(t-hexylperoxy)cyclohexane, 1,1-di(t-butylperoxy)cyclohexane, t-hexylpropoxy isopropyl monocarbonate, t-amylperoxy normal-octoate, t-butylperoxy isopropyl monocarbonate and di-t-butyl peroxide, and azo compounds such as 2,2'-azobis isobutyronitrile, 2,2'-azobis (2-methylbutyronitrile) and 2,2'-azobis(2,4-dimethylvaleronitrile). These may be used alone or two or more of them may be used in combination.

A chain transfer agent may be used as needed, which may be, for example, an α-methylstyrene dimer.

Examples of a solvent used for the solution polymerization include hydrocarbon-based solvents such as toluene, xylene, cyclohexane and methylcyclohexane, ester-based solvents such as ethyl acetate and methyl isobutyrate, ketone-based solvents such as acetone and methyl ethyl ketone, ether-based solvents such as tetrahydrofuran and dioxane, and alcohol-based solvents such as methanol and isopropanol.

The solvent used for the hydrogenation reaction following the polymerization of the (meth)acrylic ester monomer and the aromatic vinyl monomer may be the same as or different from the solvent mentioned above for polymerization. Examples include hydrocarbon-based solvents such as cyclohexane and methylcyclohexane, ester-based solvents such as ethyl acetate and methyl isobutyrate, ketone-based solvents such as acetone and methyl ethyl ketone, ether-based solvents such as tetrahydrofuran and dioxane, and alcohol-based solvents such as methanol and isopropanol.

After polymerizing the (meth)acrylic ester monomer and the aromatic vinyl monomer as described above, the aromatic double bond originating from the aromatic vinyl monomer can be hydrogenated to obtain a resin (B1) used for this embodiment.

The hydrogenation method is not particularly limited, and a known method can be employed. For example, it may be performed in a batch or continuous flow mode under a hydrogen pressure of 3-30 MPa at a reaction temperature of 60-250° C. A temperature of 60° C. or higher can prevent lengthy reaction time, and a temperature of 250° C. or lower can reduce occurrence of molecular chain scission and hydrogenation of the ester moiety.

Examples of a catalyst used for the hydrogenation reaction include solid catalysts in which a metal such as nickel, palladium, platinum, cobalt, ruthenium or rhodium, or an oxide, a salt or a complex compounds of such a metal is carried by a porous carrier such as carbon, alumina, silica, silica-alumina or diatomite.

Preferably, the resin (B1) has 70% or more of the aromatic double bonds originating from the aromatic vinyl monomer hydrogenated. In other words, the ratio of the non-hydrogenated moiety of the aromatic double bonds contained in the constituent unit originating from the aromatic vinyl monomer is preferably 30% or less. If the ratio of the non-hydrogenated moiety is less than 30%, a resin with excellent transparency can be obtained. The ratio of the non-hydrogenated moiety is more preferably less than 10%, and still more preferably less than 5%.

While the weight-average molecular weight of the resin (B1) is not particularly limited, it is preferably 50,000-400,000 and more preferably 70,000-300,000 in terms of strength and moldability.

The glass transition temperature of the resin (B1) is preferably in a range of 110-140° C., more preferably 110-135° C. and particularly preferably 110-130° C. A glass transition temperature of 110° C. or higher can give a resin sheet to be less deformable or breakable in a hot environment or in a humid and hot environment, while a grass transition temperature of 140° C. or lower can enhance workability upon continuous heat shaping using a mirror-finished roll or a shaping roll, or upon batch-mode heat shaping using a mirror-finished mold or a shaping mold.

Specific examples of the resin (B1) include Optimas 7500 and 6000 (manufactured by Mitsubishi Gas Chemical).

If the resin (B1) is to be used as the high-hardness resin, Iupizeta T-1380 (manufactured by Mitsubishi Gas Chemical) is preferably used as the polycarbonate resin (a1). In a particularly preferable aspect, a copolymer containing 75 mol % constituent unit represented by General formula (1) (methyl methacrylate wherein R1 and R2 are both methyl groups) and 25 mol % constituent unit represented by General formula (2) (wherein R3 is a hydrogen atom and R4 is a cyclohexyl group) is used as the resin (B1), a polycarbonate resin containing the constituent unit of General formula (4a) is used as the polycarbonate resin (a1), and a monohydric phenol represented by General formula (5) (wherein the carbon number of R1 is 8-22) is used as the chain terminator.

<Resin (B2)>

A resin (B2) is a copolymer (D) containing 6-77 mass % (meth)acrylic ester constituent unit, 15-71 mass % styrene constituent unit and 5-25 mass % unsaturated dicarboxylic acid constituent unit, an alloy of the copolymers (D), or an alloy of the copolymer (D) and a high-hardness resin other than the resin (B2). Examples of the high-hardness resin other than the resin (B2) include a methyl methacrylate-styrene copolymer, polymethyl methacrylate and an acrylonitrile-butadiene-styrene copolymer. If an alloy is to be used, an alloy of resins having higher Tg is preferable in order to avoid decrease in the Tg of the high-hardness resin.

Examples of a (meth)acrylic ester monomer constituting the (meth)acrylic ester constituent unit include acrylic acid, methyl acrylate, ethyl acrylate, n-butyl acrylate, 2-ethylhexyl acrylate, methacrylic acid, methyl methacrylate, ethyl methacrylate, n-butyl methacrylate and 2-ethylhexyl methacrylate, where methyl methacrylate is particularly preferable. A mixture of two or more types of these (meth)acrylic ester monomers may also be used.

The content of the (meth)acrylic ester constituent unit is 6-77 mass % and preferably 20-70 mass % with respective to the total mass of the resin (B2).

The styrene constituent unit is not particularly limited and any known styrene-based monomer can be used. It is preferably styrene, α-methylstyrene, o-methylstyrene, m-methylstyrene, p-methylstyrene, t-butylstyrene or the like in terms of availability. Among them, styrene is particularly preferable in terms of compatibility. A mixture of two or more types of these styrene-based monomers may also be used.

The content of the styrene constituent unit is 15-71 mass % and preferably 20-66 mass % to the total mass of the resin (B2).

Examples of the unsaturated dicarboxylic anhydride monomer constituting the unsaturated dicarboxylic acid constituent unit include acid anhydrides of maleic acid, itaconic acid, citraconic acid, aconitic acid or the like, where maleic anhydride is preferable in terms of compatibility with the styrene-based monomer. A mixture of two or more types of these unsaturated dicarboxylic anhydride monomers may also be used.

The content of the unsaturated dicarboxylic acid constituent unit is 5-25 mass % and preferably 8-23 mass % to the total mass of the resin (B2).

The total content of the above-described (meth)acrylic ester constituent unit, styrene constituent unit and unsaturated dicarboxylic acid constituent unit is preferably 90-100 mol %, more preferably 95-100 mol % and particularly preferably 98-100 mol % with respect to all constituent units of the resin (B2).

Specifically, the resin (B2) may contain a constituent unit other than the above-described (meth)acrylic ester constituent unit, styrene constituent unit and unsaturated dicarboxylic acid constituent unit. The amount of such a constituent unit is preferably 10 mol % or less, more preferably 5 mol % or less and particularly preferably 2 mol % or less with respect to all constituent units of the resin (B2)

An example of other constituent unit includes N-phenyl maleimide.

While a method for producing the resin (B2) is not particularly limited, examples of such a method include bulk polymerization and solution polymerization.

Specific examples of the resin (B2) include RESISFY R100, R200, R310 (manufactured by Denka Company Limited), Delpet 980N (manufactured by Asahi Kasei Chemicals) and hw55 (manufactured by Daicel-Evonik).

While the weight-average molecular weight of the resin (B2) is not particularly limited, it is preferably 50,000-300,000 and more preferably 80,000-200,000.

The glass transition point of the resin (B2) is preferably 90-150° C., more preferably 100-150° C. and particularly preferably 115-150° C.

In a preferable aspect, if the resin (B2) is to be used as the high-hardness resin, a polycarbonate resin containing the constituent unit of General formula (4a) is preferably used as the polycarbonate resin (a1). Furthermore, in a particularly preferably aspect, a monohydric phenol represented by General formula (5) (wherein, the carbon number of $R_1$ is 8-22) is used as the chain terminator. Examples of such a polycarbonate resin include Iupizeta T-1380 (manufactured by Mitsubishi Gas Chemical) and Iupilon E-2000 (manufactured by Mitsubishi Engineering-Plastics Corporation). In a preferable aspect, a copolymer composed of 6-26 mass % methyl methacrylate constituent unit, 55-21 mass % styrene constituent unit and 15-23 mass % maleic anhydride constituent unit (R100, R200 or R310; manufactured by Denka Company Limited) is used as the resin (B2) while Iupizeta T-1380 is used as the polycarbonate resin (a1). Moreover, in a particularly preferable aspect, a copolymer composed of 6 mass % methyl methacrylate constituent unit, 71% styrene and 23% maleic anhydride (R310; manufactured by Denka Company Limited) is used as the resin (B2) while Iupizeta T-1380 is used as the polycarbonate resin (a1).

<Resin (B3)>

A resin (B3) is a copolymer containing a constituent unit (c) represented by General formula (6) below and optionally a constituent unit (d) represented by General formula (7) below. The resin (B3) may or may not, but preferably, contain the constituent unit (d).

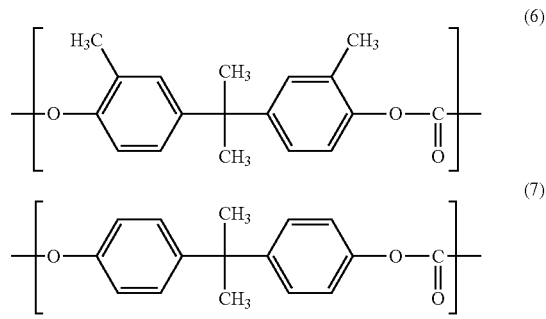

The ratio of the constituent unit (c) is preferably 50-100 mol %, more preferably 60-100 mol % and particularly preferably 70-100 mol % with respect to all constituent units of the resin (B3). The ratio of the constituent unit (d) is preferably 0-50 mol %, more preferably 0-40 mol % and particularly preferably 0-30 mol % with respect to all constituent units of the resin (B3).

The total content of the constituent units (c) and (d) is preferably 90-100 mol %, more preferably 95-100 mol % and particularly preferably 98-100 mol % with respect to the resin (B3).

The resin (B3) may contain a constituent unit other than the constituent units (c) and (d). If other constituent unit is to be contained, the amount thereof is preferably 10 mol % or less, more preferably 5 mol % or less and particularly preferably 2 mol % or less with respect to all constituent units of the resin (B3).

An example of other constituent unit includes a constituent unit represented by General formula (4a) below.

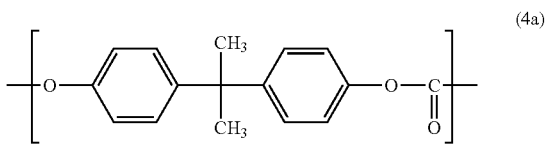

While the method for producing the resin (B3) is not particularly limited, the resin (B3) can be produced by a method similar to the above-described method for producing the polycarbonate resin (a1) except that bisphenol C is used as the monomer.

Specific examples of the resin (B3) include Iupilon KH3410UR, KH3520UR and KS3410UR (manufactured by Mitsubishi Engineering-Plastics Corporation).

The weight-average molecular weight of the resin (B3) is preferably 15,000-75,000, more preferably 20,000-70,000 and particularly preferably 25,000-65,000.

The glass transition point of the resin (B3) is preferably 105-150° C., more preferably 110-140° C. and particularly preferably 110-135° C.

In a preferable aspect, if the resin (B3) is to be used as the high-hardness resin, a polycarbonate resin containing the constituent unit of General formula (4a) is preferably used as the polycarbonate resin (a1). Furthermore, in a particularly preferable aspect, a monohydric phenol represented by General formula (5) (wherein, the carbon number of $R_1$ is 8-22) is used as the chain terminator. Examples of such a polycarbonate resin include Iupizeta T-1380 (manufactured by Mitsubishi Gas Chemical). In particular, it is preferable to use Iupilon KS3410UR (manufactured by Mitsubishi Engineering-Plastics Corporation) as the resin (B3) and Iupizeta T-1380 (manufactured by Mitsubishi Gas Chemical) as the polycarbonate resin (a1).

If the resin (B3) is to be used as the high-hardness resin, other resin contained in the high-hardness resin layer is preferably a resin that does not contain the constituent unit (c) but contains the constituent unit (d), and more preferably a resin consisting only of the constituent unit (d). Specifically, an aromatic polycarbonate resin (for example, Iupilon S-2000, Iupilon S-1000 or Iupilon E-2000; manufactured by Mitsubishi Engineering-Plastics Corporation) or the like can be used. If other resin is to be contained, the resin (B3) is contained at a ratio of preferably 45 mass % or more and more preferably 55 mass % or more with respect to the entire resin in the high-hardness resin layer.

<Resin (B4)>

A resin (B4) is a copolymer (G) containing 5-20 mass % styrene constituent unit, 60-90 mass % (meth)acrylic ester constituent unit and 5-20 mass % N-substituted maleimide constituent unit, or an alloy of the copolymer (G) and a resin (B2) described above. If an alloy is to be used, an alloy of resins having higher Tg is preferable in order to avoid decrease in the Tg of the high-hardness resin layer.

While the styrene constituent unit is not particularly limited and any known styrene-based monomer can be used, it is preferably styrene, α-methylstyrene, o-methylstyrene, m-methylstyrene, p-methylstyrene, t-butylstyrene or the like in terms of availability. Among them, styrene is particularly preferable in terms of compatibility. The copolymer (G) may contain two or more types of these styrene constituent units. The content of the styrene constituent unit is 5-20 mass %, preferably 5-15 mass % and more preferably 5-10 mass % to the total mass of the resin (B4).

Examples of the (meth)acrylic ester constituent unit include constituent units originating from acrylic acid, methyl acrylate, ethyl acrylate, n-butyl acrylate, 2-ethylhexyl acrylate, methacrylic acid, methyl methacrylate, ethyl methacrylate, n-butyl methacrylate and 2-ethylhexyl methacrylate, where a constituent unit originating from methyl methacrylate is particularly preferable. Moreover, the copolymer (G) may contain two or more types of these (meth) acrylic ester constituent units. The content of the (meth) acrylic ester constituent unit is 60-90 mass %, preferably 70-90 mass % and more preferably 80-90 mass % to the total mass of the resin (B4).

Examples of the N-substituted maleimide constituent unit in the resin (B4) include constituent units originating from N-aryl maleimides such as N-phenyl maleimide, N-chlorophenyl maleimide, N-methylphenyl maleimide, N-naphthyl maleimide, N-hydroxyphenyl maleimide, N-methoxyphenyl maleimide, N-carboxyphenyl maleimide, N-nitrophenyl maleimide and N-tribromophenyl maleimide, where a constituent unit originating from N-phenyl maleimide is preferable in terms of compatibility with the acrylic resin. The copolymer (G) may also contain two or more types of these N-substituted maleimide constituent units. The content of the N-substituted maleimide constituent unit is 5-20 mass %, preferably 5-15 mass % and more preferably 5-10 mass % to the total mass of the resin (B4).

The total content of the styrene constituent unit, the (meth)acrylic ester constituent unit and the N-substituted maleimide constituent unit is preferably 90-100 mol %, more preferably 95-100 mol % and particularly preferably 98-100 mol % with respect to the resin (B4).

The resin (B4) may contain a constituent unit other than the above-described constituent units. If other constituent unit is to be contained, the amount thereof is preferably 10 mol % or less, more preferably 5 mol % or less and particularly preferably 2 mol % or less with respect to all constituent units of the resin (B4).

Examples of other constituent unit include constituent units derived from General formulae (1) and (2) below.

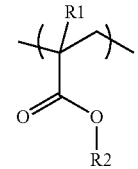

(1)

(wherein, R1 represents a hydrogen atom or a methyl group; and R2 represents a C1-C18 alkyl group)

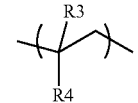

(2)

(wherein, R3 represents a hydrogen atom or a methyl group; and R4 represents a cyclohexyl group optionally substituted with a C1-C4 hydrocarbon group)

The details of Formulae (1) and (2) are the same as those described for the resin (B1) above.

While a method for producing the resin (B4) is not particularly limited, examples of such a method include solution polymerization and bulk polymerization.

A specific example of the resin (B4) includes Delpet PM120N (manufactured by Asahi Kasei Chemicals).

The weight-average molecular weight of the resin (B4) is preferably 50,000-250,000 and more preferably 100,000-200,000.

The glass transition point of the resin (B4) is preferably 110-150° C., more preferably 115-140° C. and particularly preferably 115-135° C.

In a preferable aspect, if the resin (B4) is to be used as the high-hardness resin, a polycarbonate resin containing the constituent unit of General formula (4a) is used as the polycarbonate resin (a1). Furthermore, in a particularly preferable aspect, a monohydric phenol represented by General formula (5) (wherein the carbon number of $R_1$ is 8-22) is used as the chain terminator. An example of such a polycarbonate resin includes Iupizeta T-1380 (manufactured by Mitsubishi Gas Chemical). In particular, Delpet PM-120N composed of 7% styrene constituent unit, 86% (meth)acrylic ester constituent unit and 7% N-substituted maleimide constituent unit is used as the resin (B4) while Iupizeta T-1380 is used as the polycarbonate resin (a1).

<Resin (B5)>

A resin (B5) is a resin containing a constituent unit (e) represented by General formula (8) below.

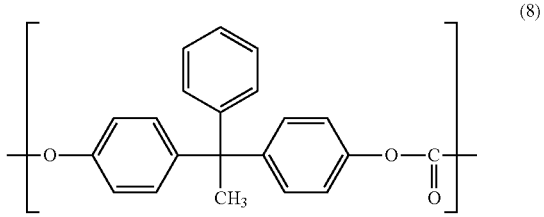

(8)

The ratio of the constituent unit (e) with respect to all constituent units of the resin (B5) is preferably 80-100 mol %, more preferably 90-100 mol % and particularly preferably 95-100 mol %.

While the resin (B5) may contain a constituent unit other than the constituent unit (e), it is preferably a polycarbonate resin consisting of the constituent unit (e). If other constituent unit is to be contained, the amount thereof is preferably 10 mol % or less, more preferably 5 mol % or less and particularly preferably 2 mol % or less with respect to all constituent units of the resin (B5).

Examples of other constituent unit include constituent units represented by General formulae (6) and (7) below.

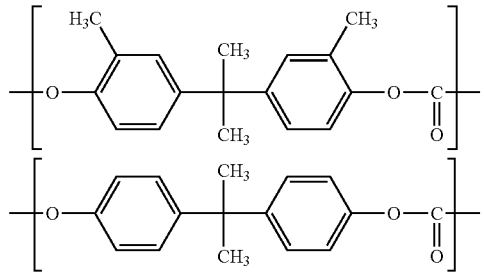

While the method for producing the resin (B5) is not particularly limited, the resin (B5) can be produced by a method similar to the above-described method for producing the polycarbonate resin (a1) except that bisphenol AP is used as the monomer.

A specific example of the resin (B5) include Iupizeta FPC0220 (manufactured by Mitsubishi Gas Chemical).

The weight-average molecular weight of the resin (B5) is preferably 10,000-1,000,000 and more preferably 15,000-50,000.

The glass transition point of the resin (B5) is preferably 120-200° C., more preferably 130-190° C. and particularly preferably 140-190° C.

In a preferable aspect, if the resin (B5) is to be used as the high-hardness resin, a polycarbonate resin containing the constituent unit of General formula (4a) is used as the polycarbonate resin (a1). An example of such a polycarbonate resin includes Iupilon E-2000 (manufactured by Mitsubishi Engineering-Plastics Corporation). Particularly preferably, Iupizeta FPC0220 (manufactured by Mitsubishi Gas Chemical) is used as the resin (B5) while Iupilon E-2000 (manufactured by Mitsubishi Engineering-Plastics Corporation) is used as the polycarbonate resin (a1).

If the resin (B5) is used as the high-hardness resin, other resin to be contained in the high-hardness resin layer is preferably a resin that does not contain the constituent unit (e) but contains the constituent unit (d) described for the resin (B3), and more preferably a resin consisting only of the constituent unit (d). Specifically, an aromatic polycarbonate resin (for example, Iupilon S-2000, Iupilon S-1000 or Iupilon E-2000; manufactured by Mitsubishi Engineering-Plastics Corporation) or the like can be used. If other resin is to be contained, the resin (B5) is contained at a ratio of preferably 45 mass % or more and more preferably 55 mass % or more with respect to the entire resin contained in the high-hardness resin layer.

While one or more types of high-hardness resins may be contained in the high-hardness resin layer, if two or more types among resins (B1)-(B5) are to be selected, they can be selected from the same or different categories and may additionally contain a high-hardness resin other than the resins (B1)-(B5). The content of the high-hardness resin contained in the high-hardness resin layer is preferably 70-100 mass % or more, more preferably 80-100 mass % or more and particularly preferably 100 mass %.

In addition to the high-hardness resin described above, the high-hardness resin layer may contain other resin. Examples of such a resin include a methyl methacrylate-styrene copolymer, polymethyl methacrylate, polystyrene, polycarbonate, a cycloolefin (co)polymer resin, an acrylonitrile-styrene copolymer, an acrylonitrile-butadiene-styrene copolymer and various elastomers. While the resin in the high-hardness resin layer preferably consists only of the high-hardness resin, if other resin is to be contained, the amount thereof is preferably 35 mass % or less, more preferably 25 mass % or less and particularly preferably 10 mass % or less with respect to the high-hardness resin layer.

The high-hardness resin layer may further contain an additive and the like. The same additive as those described in "1. Base material layer" above can be used for the same amount.

The thickness of the high-hardness resin layer affects the surface hardness and the shock resistance of the molding resin sheet. Specifically, if the high-hardness resin layer is too thin, the surface hardness becomes low whereas if the high-hardness resin layer is too thick, shock resistance is deteriorated. The thickness of the high-hardness resin layer is preferably 10-250 μm, more preferably 30-200 μm and particularly preferably 60-150 μm.

3. Lamination of Base Material Layer and High-Hardness Resin Layer

While an additional layer may exist between the base material layer and the high-hardness resin layer as described above, herein, a case where the high-hardness resin layer is laminated on the base material layer will be described. The method of lamination is not particularly limited, and they can be laminated in a similar manner even if other layer exists. There are various methods, for example, a method in which a base material layer and a high-hardness resin layer that are individually formed are layered and heat pressed together; a method in which a base material layer and a high-hardness resin layer that are individually formed are layered and attached to each other with an adhesive; a method in which a base material layer and a high-hardness resin layer are coextruded; and a method in which a preformed high-hardness resin layer is integrated with a base material layer by in-mold forming. Among them, the coextrusion method is preferable in terms of production cost and productivity.

The coextrusion method is not particularly limited. For example, in a feedblock system, the high-hardness resin layer is disposed on one side of the base material layer using a feedblock and the resultant is extruded as a sheet using a t-die and then cooled by passing through a shaping roll to give a desired laminate. Alternatively, in a multimanifold system, the high-hardness resin layer is disposed on one side of the base material layer in a multimanifold die, and the resultant is extruded as a sheet and then cooled by passing through a shaping roll to give a desired laminate.

The total thickness of the base material layer and the high-hardness resin layer is preferably 0.5-3.5 mm, more preferably 0.5-3.0 mm and particularly preferably 1.2-3.0 mm. A total thickness of 0.5 mm or more allows the sheet to maintain its rigidity. On the other hand, a total thickness of 3.5 mm or less can prevent sensitivity of a touch sensor from deteriorating when a touch screen is provided under the sheet. The ratio of the thickness of the base material layer across the total thickness of the base material layer and the high-hardness resin layer is preferably 75%-99%, more preferably 80-99% and particularly preferably 85-99%. Within such a range, both hardness and shock resistance can be achieved.

4. Hard Coat Layer

A resin sheet according to the embodiment is provided with a hard coat layer. While an additional layer may exist between the hard coat layer and the high-hardness resin layer, the hard coat layer is preferably layered on the high-hardness resin layer. The hard coat layer is preferably an acrylic hard coat. Herein, an "acrylic hard coat" refers to a coating film having a crosslinking structure formed by polymerizing a monomer, an oligomer or a prepolymer containing a (meth)acryloyl group as a functional group. The composition of the acrylic hard coat is preferably 2-98 mass % (meth)acrylic monomer, 2-98 mass % (meth)acrylic oligomer and 0-15 mass % surface modifier. In addition, it preferably contains 0.001-7 parts by mass of a photopolymerization initiator with respect to a sum of 100 parts by mass of the (meth)acrylic monomer, the (meth)acrylic oligomer and the surface modifier.

More preferably, the hard coat layer contains 5-50 mass % (meth)acrylic monomer, 50-95 mass % (meth)acrylic oligomer and 1-10 mass % surface modifier, and particularly preferably contains 20-40 mass % (meth)acrylic monomer, 60-80 mass % (meth)acrylic oligomer and 2-5 mass % surface modifier.

The amount of the photopolymerization initiator is more preferably 0.01-5 parts by mass and particularly preferably 0.1-3 parts by mass with respect to a sum of 100 parts by mass of the (meth)acrylic monomer, the (meth)acrylic oligomer and the surface modifier (1) (Meth)Acrylic Monomer Any (meth)acrylic monomer can be used as long as it has a (meth)acryloyl group as a functional group in the molecule, which may be a monofunctional monomer, a bifunctional monomer or a trifunctional or higher monomer.

Examples of the monofunctional monomer include (meth) acrylic acid and (meth)acrylic ester; specific examples of the bifunctional and/or the trifunctional or higher (meth)acrylic monomer include diethylene glycol di(meth)acrylate, dipropylene glycol di(meth)acrylate, tripropylene glycol di(meth) acrylate, 1,6-hexanediol di(meth)acrylate, bisphenol A diglycidyl ether di(meth)acrylate, tetraethylene glycol di(meth)acrylate, neopentyl glycol hydroxypivalate diacrylate, neopentyl glycol di(meth)acrylate, 1,4-butanediol diacrylate, 1,3-butylene glycol di(meth)acrylate, dicyclopentanyl di(meth)acrylate, polyethylene glycol diacrylate, 1,4-butanediol oligoacrylate, neopentyl glycol oligoacrylate, 1,6-hexanediol oligoacrylate, trimethylolpropane tri(meth) acrylate, trimethylolpropane ethoxytri(meth)acrylate, trimethylolpropane propoxy tri(meth)acrylate, pentaerythritol tri(meth)acrylate, glycerylpropoxy tri(meth)acrylate, trimethylolpropane trimethacrylate, trimethylolpropane ethylene oxide adduct triacrylate, glycerin propylene oxide adduct triacrylate and pentaerythritol tetraacrylate.

The hard coat layer may contain one or more types of (meth)acrylic monomers.

(2) (Meth)Acrylic Oligomer

Examples of the (meth)acrylic oligomer include a bifunctional or higher polyfunctional urethane (meth)acrylate oligomer [hereinafter, also referred to as a polyfunctional urethane (meth)acrylate oligomer], a bifunctional or higher polyfunctional polyester (meth)acrylate oligomer [hereinafter, also referred to as a polyfunctional polyester (meth) acrylate oligomer], and a bifunctional or higher polyfunctional epoxy (meth)acrylate oligomer [hereinafter, also referred to as a polyfunctional epoxy (meth)acrylate oligomer]. The hard coat layer may contain one or more types of (meth)acrylic oligomers.

Examples of the polyfunctional urethane (meth)acrylate oligomer include a product resulting from urethanization reaction between a (meth)acrylate monomer that has at least one (meth)acryloyloxy group and hydroxyl group in a single molecule and polyisocyanate; and a product resulting from urethanization reaction between an isocyanate compound obtained by reacting a polyol with polyisocyanate and a (meth)acrylate monomer that has at least one (meth)acryloyloxy group and hydroxyl group in a single molecule.

Examples of the (meth)acrylate monomer that has at least one (meth)acryloyloxy group and hydroxyl group in a single molecule that is used for the urethanization reaction include 2-hydroxyethyl (meth)acrylate, 2-hydroxypropyl (meth) acrylate, 2-hydroxybutyl (meth)acrylate, 2-hydroxy-3-phenoxypropyl (meth)acrylate, glycerin di(meth)acrylate, trimethylolpropane di(meth)acrylate, pentaerythritol tri(meth) acrylate and dipentaerythritol penta(meth)acrylate.

Examples of polyisocyanate used for the urethanization reaction include hexamethylene diisocyanate, lysine diisocyanate, isophorone diisocyanate, dicyclohexyl methane diisocyanate, tolylene diisocyanate, xylylene diisocyanate, diisocyanates obtained by hydrogenating aromatic isocyanates among these diisocyanates (for example, diisocyanates such as hydrogenated tolylene diisocyanate and hydrogenated xylylene diisocyanate), polyisocyanates of di- or tri-isocyanates such as triphenylmethane triisocyanate and dimethylene triphenyl triisocyanate, and polyisocyanates obtained by multimerization of diisocyanates.

As the polyols used for the urethanization reaction, aromatic, aliphatic and alicyclic polyols, polyester polyol and polyether polyol are generally used. Examples of the aliphatic and alicyclic polyols generally include 1,4-butanediol, 1,6-hexanediol, neopentyl glycol, ethylene glycol, propylene glycol, trimethylolethane, trimethylolpropane, dimethylolheptane, dimethylolpropionic acid, dimethylolbutyric acid, glycerin and hydrogenated bisphenol A.

Examples of polyester polyol include those obtained through a dehydration condensation reaction between a polyol mentioned above and a polycarbonic acid. Examples of specific compounds of the polycarbonic acid include succinic acid, adipic acid, maleic acid, trimellitic acid, hexahydrophthalic acid, phthalic acid, isophthalic acid and terephthalic acid. These polycarbonic acids may be anhydrides. In addition, examples of polyether polyol include polyalkylene glycol, and polyoxyalkylene modified polyol obtained through reaction between a polyol or a phenol mentioned above and alkylene oxide.

Moreover, the polyfunctional polyester (meth)acrylate oligomer can be obtained through a dehydration condensation reaction between a (meth)acrylic acid, a polycarbonic acid and a polyol. Examples of the polycarbonic acid used for the dehydration condensation reaction include succinic acid, adipic acid, maleic acid, itaconic acid, trimellitic acid, pyromellitic acid, hexahydrophthalic acid, phthalic acid, isophthalic acid and terephthalic acid. These polycarbonic acids may be anhydrides. In addition, examples of the polyol used for the dehydration condensation reaction include 1,4-butanediol, 1,6-hexanediol, diethylene glycol, triethylene glycol, propylene glycol, neopentyl glycol, dimethylolheptane, dimethylolpropionic acid, dimethylolbutyric acid, trimethylolpropane, di-trimethylolpropane, pentaerythritol and dipentaerythritol.

The polyfunctional epoxy (meth)acrylate oligomer can be obtained through an addition reaction between a polyglycidyl ether and a (meth)acrylic acid. Examples of the polyglycidyl ether include ethylene glycol diglycidyl ether, propylene glycol diglycidyl ether, tripropylene glycol diglycidyl ether, 1,6-hexanediol diglycidyl ether and bisphenol A diglycidyl ether.

(3) Surface Modifier

A surface modifier used for the above-described embodiment refers to one that modifies the surface performance of the hard coat layer, such as a leveling agent, an antistatic agent, a surfactant, a water and oil repellent, inorganic particles and organic particles.

Examples of the leveling agent include a polyether-modified polyalkylsiloxane, a polyether-modified siloxane, a polyester-modified hydroxyl group-containing polyalkylsiloxane, a polyether-modified polydimethylsiloxane having an alkyl group, a modified polyether and a silicon-modified acryl.

Examples of the antistatic agent include a glycerin fatty acid ester monoglyceride, a glycerin fatty acid ester organic acid monoglyceride, a polyglycerin fatty acid ester, a sorbitan fatty acid ester, a cationic surfactant and an anionic surfactant.

Examples of the inorganic particles include silica particles, alumina particles, zirconium particles, silicon particles, silver particles and glass particles.

Examples of the organic particles include acrylic particles and silicone particles.

Examples of the surfactant and the water and oil repellent include fluorine-containing surfactants and water and oil repellents such as a fluorine group/lipophilic group-containing oligomer and a fluorine group/hydrophilic group/lipophilic group/UV reactive group-containing oligomer.

(4) Photopolymerization Initiator

The hard coat layer may contain a photopolymerization initiator. Herein, a photopolymerization initiator refers to a light-induced radical generator.

Examples of the monofunctional photopolymerization initiator that can be used for the above-described embodiment include 4-(2-hydroxyethoxy)phenyl (2-hydroxy-2-propyl)ketone [Darocur 2959: manufactured by Merck]; α-hydroxy-α,α'-dimethyl acetophenone [Darocur 1173: manufactured by Merck]; acetophenone-based initiators such as methoxy acetophenone, 2,2'-dimethoxy-2-phenyl acetophenone [Irgacure-651] and 1-hydroxy-cyclohexylphenyl ketone; benzoin ether-based initiators such as benzoin ethyl ether and benzoin isopropyl ether; as well as a halogenated ketone, acylphosphine oxide, acylphosphonate and the like.

(5) Method for Forming Hard Coat Layer

The method for forming the hard coat layer is not particularly limited. For example, the hard coat layer may be formed by applying a hard coat solution onto the layer under the hard coat layer (for example, the high-hardness resin layer) and subsequently subjecting the resultant to photopolymerization.

The method for applying the hard coat solution (polymerizable composition) is not particularly limited and a known method can be employed. Examples of such a method include a spin coating method, a dip method, a spray method, a slide coating method, a bar coating method, a roll coating method, a gravure coating method, a meniscus coating method, a flexographic printing method, a screen-printing method, a bead coating method and a brush coating method.

A lamp used for light irradiation for photopolymerization is one having the light emission distribution at optical wavelengths of 420 nm or less, examples being a low-pressure mercury lamp, a medium-pressure mercury lamp, a high-pressure mercury lamp, an ultra-high-pressure mercury lamp, a chemical lamp, a black light lamp, a microwave powered mercury lamp and a metal halide lamp. Among them, a high-pressure mercury lamp or a metal halide lamp is preferable since they efficiently emit light in the active wavelength region of the initiator but not much of short-wavelength light that deteriorates viscoelastic property of the resulting polymer by crosslinking or long-wavelength light that heats and evaporates the reaction composition.

The irradiation intensity of the above-described lamp is a factor that influences the polymerization degree of the resulting polymer, which can appropriately be regulated according to performance of the article of interest. If a usual cleavage-type initiator having an acetophenone group is added, illuminance is preferably in a range of 0.1-300 mW/cm$^2$. Particularly preferably, a metal halide lamp is used to give illuminance of 10-40 mW/cm$^2$.

The photopolymerization reaction is inhibited by oxygen in the air or oxygen dissolved in the reactive composition. Accordingly, light irradiation is desirably conducted by a technique that can eliminate inhibition of the reaction caused by oxygen. As one of such techniques, there is a method in which the reactive composition is covered with a polyethylene terephthalate or Teflon film so as to block contact with oxygen, while the composition is irradiated with light via this film. Alternatively, the composition may be irradiated with light via a light transmitting window in an inert atmosphere where oxygen has been replaced with inert gas such as nitrogen gas or carbon dioxide gas.

When light irradiation is conducted in an inert atmosphere, a certain amount of inert gas is constantly introduced into this atmosphere to keep the oxygen concentration of the atmosphere to a low level. Due to this introduced gas, air flow is generated on the surface of the reactive composition, which causes evaporation of the monomers. In order to suppress the evaporation level of the monomer, the air flow velocity of the inert gas is preferably 1 msec or lower and more preferably 0.1 m/sec or lower with respect to the laminate applied with the hard coat solution that transfers in the inert gas atmosphere. By keeping the air flow velocity within the above-mentioned range, evaporation of the monomer due to the air flow can substantially be suppressed.

In order to enhance the adhesiveness of the hard coat layer, the surface to be coated may be subjected to a pretreatment. Examples of such a treatment include known techniques such as sand blasting, a solvent treatment, a corona discharge treatment, a chromic acid treatment, a flame treatment, a hot air treatment, an ozone treatment, an ultraviolet treatment and a primer treatment with a resin composition.

Preferably, a metal halide lamp with a UV light (254 nm) radiation output of 20 mW/cm$^2$ is used so that the pencil hardness of the hard coat layer after the ultraviolet irradiation is 2H or harder.

The thickness of the hard coat layer is favorably 1 μm or more and 40 μm or less, and more favorably 2 μm or more and 10 μm or less. A sufficient hardness can be achieved with a thickness of 1 μm or more. In addition, a thickness of 40 μm or less can suppress generation of cracks upon bending. Here, the thickness of the hard coat layer can be measured by observing the cross section with a microscope or the like and actually measuring from the interface to the surface of the coating film.

The hard coat layer may further be modified. For example, it may be subjected to any one of an antireflection treatment, an antifouling treatment, an antistatic treatment, a weatherproof treatment and an anti-glare treatment. The methods of these treatments are not particularly limited and any known method can be employed. Examples of such methods include a method of applying a reflection reduction paint, a method of depositing a dielectric thin film, and a method of applying an antistatic paint.

The pencil hardness of the resin sheet according to the embodiment is preferably 2H or harder, for example, 2H-4H and particularly preferably 3H-4H. As used herein, a pencil hardness of a resin sheet refers to a hardness of the hardest pencil that left no scratch on the surface of the hard coat layer when the pencil was pressed against the surface at an angle of 45° with a load of 750 g while stepwisely increasing the hardness of the pencils (pencil scratch hardness test according to JIS K 5600-5-4).

One embodiment provides a molded resin article molded by using the above-described molding resin sheet. While the molding method is not particularly limited, thermoforming is suitable considering the characteristics of the resin sheet of the embodiment. Thermoforming may be carried out by a method that is generally employed in the technical field, such as heat press molding, pressure molding, vacuum molding and TOM molding. The molding temperature is preferably 100° C. to 200° C.

EXAMPLES

Hereinafter, examples of the present invention will be described, although the present invention should not be limited to the aspects described in the examples.

<Measurement of Glass Transition Point (Tg)>

Differential scanning calorimeter DSC7020 manufactured by Hitachi High-Tech Science Corporation was used to measure glass transition points of polycarbonate resins and high-hardness resins used in Examples and Comparative examples at a temperature rising rate of 10° C./min in a nitrogen atmosphere. The weight of the resins used for the measurement was 10-20 mg.

<Measurement of Pencil Hardness of High-Hardness Resin>

A pencil hardness of the laminate of the high-hardness resin layer and the polycarbonate resin layer produced in each of Examples and Comparative examples was evaluated on the high-hardness resin layer side before forming the hard coat layer, by a pencil scratch hardness test according to JIS K 5600-5-4. The pencil hardness was evaluated as a hardness of the hardest pencil that left no scratch on the surface of the hard-hardness resin layer when the pencil was pressed against the surface at an angle of 45° with a load of 750 g while stepwisely increasing the hardness of the pencils. Hardness of HB or harder was considered acceptable.

<Measurement of Pencil Hardness of Resin Sheet>

The resin sheets produced in Examples and Comparative examples were evaluated by a pencil scratch hardness test according to JIS K 5600-5-4. The pencil hardness was evaluated as a hardness of the hardest pencil that left no scratch on the surface of the hard coat layer when the pencil was pressed against the surface at an angle of 45° with a load of 750 g while stepwisely increasing the hardness of the pencils. Hardness of 2H or harder was considered acceptable.

<Preparation of Molded Article Having Curved Shape and Evaluation of Hard Coat Cracks after Molding>

The resin sheets produced in Examples and Comparative examples were thermoformed. A heat press mold with a clearance (gap provided for sandwiching the molding sheet with the mold from above and bottom) of 2 mm and a radius of 50 mm was used for Examples 1-3 and 5-15 and Comparative examples 1, 2 and 4-7, while a heat press mold with a clearance of 3.5 mm and a radius of 100 mm was used for Example 4 and Comparative example 3. The pressure applied on the heat press mold was 0.6 MPa. The material of the mold was aluminum. The mold temperature upon thermoforming was 124° C. in Examples 1-5, 7-11 and 13-15 and Comparative examples 5 and 6, and 143° C. in Examples 6 and 12 and Comparative examples 1-4 and 7.

The presence of cracks was checked for the 50-mm or the 100-mm radius part of the resulting molded article. When the heat press mold with a clearance of 2 mm was used to mold a resin sheet in which a total thickness of the base material layer and the high-hardness resin layer was 0.5 mm, 1.2 mm or 1.5 mm, a monolayer polycarbonate sheet with a thickness of 1.5 mm, 0.8 mm or 0.5 mm was placed underneath, respectively, to give a total thickness of 2 mm upon heat press molding.

<Flow Marks>

The appearance of the laminate of the high-hardness resin layer and the polycarbonate resin layer produced in each of Examples and Comparative examples was visually inspected under a three-wavelength fluorescent lamp before forming the hard coat layer to check the presence of a scale pattern and cloudiness. The laminate was judged to have "no flow mark" when neither scale pattern nor cloudiness was observed whereas the laminate was judged to have "flow mark" when either scale pattern or cloudiness was observed.

Example 1: R100 (Tg 124° C.)/Low-Tg PC (Tg 125° C.)/1.2 mmt

A multilayer extrusion machine provided with a 35-mm-diameter single screw extruder, a 65-mm-diameter single screw extruder, a feedblock connected to each of the extruders and a t-die connected to the feedblock was used to mold a laminate comprising a base material layer and a high-hardness resin layer. Specifically, a high-hardness resin (B2) (a copolymer of 21 mass % methyl methacrylate constituent unit, 64 mass % styrene constituent unit and 15 mass % maleic anhydride constituent unit; RESISFY R100 (manufactured by Denka Company Limited)) was continuously loaded into the 35-mm-diameter single screw extruder, and extruded under the conditions of a cylinder temperature of 230° C. and a discharge speed of 2.6 kg/h. In the meantime, a polycarbonate resin (Iupizeta T-1380; manufactured by Mitsubishi Gas Chemical) was continuously loaded into the 65-mm-diameter single screw extruder, and extruded under the conditions of a cylinder temperature of 240° C. and a discharge speed of 50.0 kg/h.

The extruded high-hardness resin and polycarbonate resin were loaded into the feedblock provided with 2-type 2-layer distribution pins to laminate the high-hardness resin and the polycarbonate resin at a temperature of 240° C. The resultant was further loaded into the t-die and extruded as a sheet at a temperature of 240° C., and cooled while a mirror surface was transferred thereon with three mirror-finishing rolls at temperatures of 120° C., 130° C. and 190° C., respectively, from the upstream, thereby obtaining a laminate of the hard-hardness resin and the polycarbonate resin layer (base material layer). The thickness of the resulting laminate was 1.2 mm while the thickness of the high-hardness resin layer was 60 µm near the center.

A hard coat layer was formed on the high-hardness resin layer side of the laminate obtained above. The material of the hard coat layer was as follows.

1 parts by mass of a photopolymerization initiator: I-184 (manufactured by BASF [compound name: 1-hydroxycyclohexylphenyl ketone])
with respect to a 100 parts by mass of a mixture of:
U6HA: 60 mass % hexafunctional urethane acrylate oligomer (manufactured by Shin-Nakamura Chemical);
4EG-A: 35 mass % PEG200# diacrylate (manufactured by Kyoeisha Chemical); and
RS-90: 5 mass % fluorine-containing group/hydrophilic group/lipophilic group/UV reactive group-containing oligomer (manufactured by DIC).

The above material was applied to the laminate with a bar coater, and the hard coat was cured under a metal halide lamp (20 mW/cm$^2$) for 5 seconds to prepare a resin sheet. The thickness of the hard coat layer was 6 µm.

Example 2: R100 (Tg 124° C.)/Low-Tg PC (Tg 125° C.)/2 mmt

A resin sheet was prepared in the same manner as Example 1 except that the discharge speed for extruding the polycarbonate resin with the single screw extruder was 83.0 kg/h, and the thickness of the laminate of the high-hardness resin layer and the polycarbonate resin layer (base material layer) was 2 mm (the thickness of the high-hardness resin layer was 60 µm near the center).

Example 3: R100 (Tg 124° C.)/Low-Tg PC (Tg 125° C.)/0.5 mmt

A resin sheet was prepared in the same manner as Example 1 except that the discharge speeds for extruding the high-hardness resin (B2) and the polycarbonate resin with the single screw extruders were 4.8 kg/h and 35.0 kg/h, respectively, and the thickness of the laminate of the high-hardness resin layer and the polycarbonate resin layer (base material layer) was 0.5 mm (the thickness of the high-hardness resin layer was 60 µm near the center).

Example 4: R100 (Tg 124° C.)/Low-Tg PC (Tg 125° C.)/3.5 mmt

A resin sheet was prepared in the same manner as Example 1 except that the discharge speeds for extruding the high-hardness resin (B2) and the polycarbonate resin with the single screw extruders were 1.3 kg/h and 72.0 kg/h, respectively, and the thickness of the laminate of the high-hardness resin layer and the polycarbonate resin layer (base material layer) was 3.5 mm (the thickness of the high-hardness resin layer was 60 µm near the center).

Example 5: R310 (Tg 141° C.)/Low-Tg PC (Tg 125° C.)/2 mmt

A laminate of a base material layer and a high-hardness resin layer was molded using the same multilayer extrusion machine as Example 1. Specifically, a high-hardness resin (B2) (a copolymer of 6 mass % methyl methacrylate constituent unit, 71 mass % styrene constituent unit and 23 mass % maleic anhydride constituent unit; RESISFY R310 (manufactured by Denka Company Limited)) was continuously loaded into the 35-mm-diameter single screw extruder, and extruded under the conditions of a cylinder temperature of 240° C. and a discharge speed of 2.6 kg/h. In the meantime, a polycarbonate resin (Iupizeta T-1380; manufactured by Mitsubishi Gas Chemical) was continuously loaded into the 65-mm-diameter single screw extruder, and extruded under the conditions of a cylinder temperature of 240° C. and a discharge speed of 83.0 kg/h.

Thereafter, the resultant was extruded using the t-die in the same manner as Example 1, thereby obtaining a laminate of the high-hardness resin layer and the polycarbonate resin layer (base material layer). The thickness of the resulting laminate was 2 mm while the thickness of the high-hardness resin layer was 60 µm near the center.

A hard coat layer was formed in the same manner as Example 1.

Example 6: R310 (Tg 141° C.)/S-1000 (Tg 147° C.)/2 mmt

A laminate of a base material layer and a high-hardness resin layer was molded using the same multilayer extrusion machine as Example 1. Specifically, a high-hardness resin (B2) (a copolymer of 6 mass % methyl methacrylate constituent unit, 71 mass % styrene constituent unit and 23 mass % maleic anhydride constituent unit; RESISFY R310 (manufactured by Denka Company Limited)) was continuously loaded into the 35-mm-diameter single screw extruder, and extruded under the conditions of a cylinder temperature of 240° C. and a discharge speed of 2.6 kg/h. In the meantime, a polycarbonate resin (Iupilon S-1000; manufactured by Mitsubishi Engineering-Plastics Corporation) was continuously loaded into the 65-mm-diameter single screw extruder, and extruded under the conditions of a cylinder temperature of 280° C. and a discharge speed of 83.0 kg/h.

The extruded high-hardness resin and polycarbonate resin were loaded into the feedblock provided with 2-type 2-layer distribution pins to laminate the high-hardness resin and the polycarbonate resin at a temperature of 280° C. The resultant was further loaded into the t-die and extruded as a sheet at a temperature of 280° C., and cooled while a mirror surface was transferred thereon with three mirror-finishing rolls at temperatures of 120° C., 130° C. and 190° C., respectively, from the upstream, thereby obtaining a laminate of the hard-hardness resin and the polycarbonate resin layer (base material layer). The thickness of the resulting laminate was 2 mm while the thickness of the high-hardness resin layer was 60 μm near the center.

A hard coat layer was formed in the same manner as Example 1.

Example 7: PM-120N (Tg 120° C.)/Low-Tg PC (Tg 125° C.)/1.5 mmt

A laminate of a base material layer and a high-hardness resin layer was molded using the same multilayer extrusion machine as Example 1. Specifically, a high-hardness resin (B4) (a copolymer of 7 mass % styrene constituent unit, 86 mass % methyl methacrylate constituent unit and 7 mass % N-phenyl maleimide constituent unit; Delpet PM120N (manufactured by Asahi Kasei Chemicals)) was continuously loaded into the 35-mm-diameter single screw extruder, and extruded under the conditions of a cylinder temperature of 230° C. and a discharge speed of 2.6 kg/h. In the meantime, a polycarbonate resin (Iupizeta T-1380; manufactured by Mitsubishi Gas Chemical) was continuously loaded into the 65-mm-diameter single screw extruder, and extruded under the conditions of a cylinder temperature of 240° C. and a discharge speed of 62.0 kg/h.

Thereafter, the resultant was extruded using the t-die in the same manner as Example 1, thereby obtaining a laminate of the high-hardness resin layer and the polycarbonate resin layer (base material layer). The thickness of the resulting laminate was 1.5 mm while the thickness of the high-hardness resin layer was 60 μm near the center.

A hard coat layer was formed in the same manner as Example 1.

Example 8: R200 (Tg 126° C.)/Low-Tg PC (Tg 125° C.)/2 mmt

A laminate of a base material layer and a high-hardness resin layer was molded using the same multilayer extrusion machine as Example 1. Specifically, a high-hardness resin (B2) (a copolymer of 26 mass % methyl methacrylate constituent unit, 55 mass % styrene constituent unit and 19 mass % maleic anhydride constituent unit; RESISFY R200 (manufactured by Denka Company Limited)) was continuously loaded into the 35-mm-diameter single screw extruder, and extruded under the conditions of a cylinder temperature of 230° C. and a discharge speed of 2.6 kg/h. In the meantime, a polycarbonate resin (Iupizeta T-1380; manufactured by Mitsubishi Gas Chemical) was continuously loaded into the 65-mm-diameter single screw extruder, and extruded under the conditions of a cylinder temperature of 240° C. and a discharge speed of 83.0 kg/h.

Thereafter, the resultant was extruded using the t-die in the same manner as Example 1, thereby obtaining a laminate of the high-hardness resin layer and the polycarbonate resin layer (base material layer). The thickness of the resulting laminate was 2 mm while the thickness of the high-hardness resin layer was 60 μm near the center.

A hard coat layer (Z) was formed in the same manner as Example 1.

Example 9: C-PC (KH3410UR) (Tg 118° C.)/Low-Tg PC (Tg 125° C.)/2 mmt

A laminate of a base material layer and a high-hardness resin layer was molded using the same multilayer extrusion machine as Example 1. Specifically, a high-hardness resin (B3) (a polycarbonate resin; Iupilon KH3410UR (manufactured by Mitsubishi Engineering-Plastics Corporation)) was continuously loaded and extruded under the conditions of a cylinder temperature of 270° C. and a discharge speed of 2.6 kg/h. In the meantime, a polycarbonate resin (Iupizeta T-1380; manufactured by Mitsubishi Gas Chemical) was continuously loaded into the 65-mm-diameter single screw extruder, and extruded under the conditions of a cylinder temperature of 240° C. and a discharge speed of 83.0 kg/h.

Thereafter, the resultant was extruded using the t-die in the same manner as Example 1, thereby obtaining a laminate of the high-hardness resin layer and the polycarbonate resin layer (base material layer). The thickness of the resulting laminate was 2 mm while the thickness of the high-hardness resin layer was 60 μm near the center.

A hard coat layer was formed in the same manner as Example 1.

Example 10: Alloy of R100 and PM120N (Tg 123° C.)/Low-Tg PC (Tg 125° C.)/1.2 mmt A copolymer of 21 mass % methyl methacrylate constituent unit, 64 mass % styrene constituent unit and 15 mass % maleic anhydride constituent unit (RESISFY R100 (manufactured by Denka Company Limited)) for 75 mass %, and a copolymer of 7 mass % styrene constituent unit, 86 mass % methyl methacrylate constituent unit and 7 mass % N-phenyl maleimide constituent unit (Delpet PM120N; manufactured by Asahi Kasei Chemicals) for 25 mass % were loaded into an extruder with a screw diameter of 26 mm (TEM-26SS, L/D≈40; manufactured by Toshiba Machine Co., Ltd), and melt kneaded at 240° C. to give a high-hardness resin (B4).

A laminate of a base material layer and a high-hardness resin layer was molded using the same multilayer extrusion machine as Example 1. Specifically, the above-described high-hardness resin (B4) was continuously loaded into the 35-mm-diameter single screw extruder, and extruded under the conditions of a cylinder temperature of 230° C. and a discharge speed of 2.6 kg/h. In the meantime, a polycarbonate resin (Iupizeta T-1380; manufactured by Mitsubishi Gas Chemical) was continuously loaded into the 65-mm-diameter single screw extruder, and extruded under the conditions of a cylinder temperature of 240° C. and a discharge speed of 50.0 kg/h.

Thereafter, the resultant was extruded using the t-die in the same manner as Example 1, thereby obtaining a laminate of the high-hardness resin layer and the polycarbonate resin layer (base material layer). The thickness of the resulting laminate was 1.2 mm while the thickness of the high-hardness resin layer was 60 μm near the center.

A hard coat layer was formed in the same manner as Example 1.

Example 11: R310 (Tg 141° C.)/Low-Tg PC (Tg 125° C.)/0.5 mmt

A laminate of a base material layer and a high-hardness resin layer was molded using the same multilayer extrusion machine as Example 1. Specifically, a high-hardness resin (B2) (a copolymer of 6 mass % methyl methacrylate constituent unit, 71 mass % styrene constituent unit and 23 mass % maleic anhydride constituent unit; RESISFY R310 (manufactured by Denka Company Limited)) was continuously loaded into the 35-mm-diameter single screw extruder, and extruded under the conditions of a cylinder temperature of 230° C. and a discharge speed of 8 kg/h. In the meantime, a polycarbonate resin (Iupizeta T-1380; manufactured by Mitsubishi Gas Chemical) was continuously loaded into the 65-mm-diameter single screw extruder, and extruded under the conditions of a cylinder temperature of 240° C. and a discharge speed of 35.0 kg/h.

Thereafter, the resultant was extruded using the t-die in the same manner as Example 1, thereby obtaining a laminate of the high-hardness resin layer and the polycarbonate resin layer (base material layer). The thickness of the resulting laminate (Y2) was 0.5 mm while the thickness of the high-hardness resin layer was 100 μm near the center.

A hard coat layer was formed in the same manner as Example 1.

Example 12: FPC0220 (Tg 184° C.)/E2000 (147° C.)/1.2 mmt

A laminate of a base material layer and a high-hardness resin layer was molded using the same multilayer extrusion machine as Example 1. Specifically, a high-hardness resin (B5) (a polycarbonate resin represented by General formula (8); Iupizeta FPC0220 (manufactured by Mitsubishi Gas Chemical)) was continuously loaded into the 35-mm-diameter single screw extruder, and extruded under the conditions of a cylinder temperature of 300° C. and a discharge speed of 2.6 kg/h. In the meantime, a polycarbonate resin (Iupilon E2000; manufactured by Mitsubishi Gas Chemical) was continuously loaded into the 65-mm-diameter single screw extruder, and extruded under the conditions of a cylinder temperature of 280° C. and a discharge speed of 50.0 kg/h.

The extruded high-hardness resin and polycarbonate resin were loaded into the feedblock provided with 2-type 2-layer distribution pins to laminate the high-hardness resin and the polycarbonate resin at a temperature of 280° C. The resultant was further extruded as a sheet with the t-die at a temperature of 280° C., and cooled while a mirror surface was transferred thereon with three mirror-finishing rolls at temperatures of 120° C., 130° C. and 190° C. respectively, from the upstream, thereby obtaining a laminate of the hard-hardness resin and the polycarbonate resin layer (base material layer). The thickness of the resulting laminate was 1.2 mm while the thickness of the high-hardness resin layer was 60 μm near the center.

A hard coat layer was formed in the same manner as Example 1.

Example 13: MS-H (Tg 115° C.)/Low-Tg PC (Tg 125° C.)/1.2 mmt

A laminate of a base material layer and a high-hardness resin layer was molded using the same multilayer extrusion machine as Example 1. A high-hardness resin (B1) (a resin where R1 and R2 are both methyl groups in General formula (1), and R3 is a hydrogen atom and R4 is a cyclohexyl group in General formula (2); consisting of 75 mol % (meth)acrylic ester constituent unit and 25 mol % aliphatic vinyl constituent unit, with a weight-average molecular weight of 120,000) was continuously loaded into the 35-mm-diameter single screw extruder, and extruded under the conditions of a cylinder temperature of 240° C. and a discharge speed of 2.6 kg/h. In the meantime, a polycarbonate resin (Iupizeta T-1380; manufactured by Mitsubishi Gas Chemical) was continuously loaded into the 65-mm-diameter single screw extruder, and extruded under the conditions of a cylinder temperature of 240° C. and a discharge speed of 50.0 kg/h.

Thereafter, the resultant was extruded using the t-die in the same manner as Example 1, thereby obtaining a laminate of the high-hardness resin layer and the polycarbonate resin layer (base material layer). The thickness of the resulting laminate was 1.2 mm while the thickness of the high-hardness resin layer was 60 μm near the center.

A hard coat layer was formed in the same manner as Example 1.

Example 14: MS-H (Tg 115° C.)/Low-Tg PC (125° C.)/0.5 mmt

A resin sheet was prepared in the same manner as Example 14 except that the conditions for extruding the high-hardness resin (B1) with the single screw extruder were a cylinder temperature of 230° C. and a discharge speed of 8.0 kg/h, the discharge speed for extruding the polycarbonate resin with the single screw extruder was 35.0 kg/h, and the thickness of the laminate of the high-hardness resin layer and the polycarbonate resin layer (base material layer) was 0.5 mm (the thickness of the high-hardness resin layer was 60 μm near the center).

Example 15: Alloy of R100 and PMMA (Tg 115° C.)/Low-Tg PC (Tg 125° C.)/1.2 mmt

A copolymer consisting of 21 mass % methyl methacrylate constituent unit, 64 mass % styrene constituent unit and 15 mass % maleic anhydride constituent unit (RESISFY R100; manufactured by Denka Company Limited) for 75 mass % and an acrylic resin (Parapet HR-1000L (PMMA); manufactured by Kuraray Co. Ltd.) for 25 mass % was loaded into an extruder having a screw diameter of 26 mm (TEM-26SS, L/D≈40; manufactured by Toshiba Machine Co., Ltd), and melt kneaded at 240° C. to give a high-hardness resin (B2).

A laminate of a base material layer and a high-hardness resin layer was molded using the same multilayer extrusion machine as Example 1. Specifically, the above-described high-hardness resin was continuously loaded into the 35-mm-diameter single screw extruder, and extruded under the conditions of a cylinder temperature of 230° C. and a discharge speed of 2.6 kg/h. In the meantime, a polycarbonate resin (Iupizeta T-1380; manufactured by Mitsubishi Gas Chemical) was continuously loaded into the 65-mm-diameter single screw extruder, and extruded under the conditions of a cylinder temperature of 240° C. and a discharge speed of 50.0 kg/h.

Thereafter, the resultant was extruded using the t-die in the same manner as Example 1, thereby obtaining a laminate of the high-hardness resin layer and the polycarbonate resin layer (base material layer). The thickness of the resulting laminate was 1.2 mm while the thickness of the high-hardness resin layer was 60 μm near the center.

A hard coat layer was formed in the same manner as Example 1.

Comparative Example 1: MS-H (Tg 115° C.)/S1000 (Tg 147° C.)/1.2 mmt

A laminate of a base material layer and a high-hardness resin layer was molded using the same multilayer extrusion machine as Example 1. Specifically, a high-hardness resin (B1) (a resin where R1 and R2 are both methyl groups in General formula (1), and R3 is a hydrogen atom and R4 is a cyclohexyl group in General formula (2); 75 mol % (meth)acrylic ester constituent unit and 25 mol % aliphatic vinyl constituent unit, with a weight-average molecular weight of 120,000) was continuously loaded into the 35-mm-diameter single screw extruder, and extruded under the conditions of a cylinder temperature of 240° C. and a discharge speed of 2.6 kg/h. In the meantime, a polycarbonate resin (Iupilon S-1000; manufactured by Mitsubishi Engineering-Plastics Corporation) was continuously loaded into the 65-mm-diameter single screw extruder, and extruded under the conditions of a cylinder temperature of 280° C. and a discharge speed of 50.0 kg/h.

The extruded high-hardness resin and polycarbonate resin were loaded into the feedblock provided with 2-type 2-layer distribution pins to laminate the high-hardness resin and the polycarbonate resin at a temperature of 270° C. The resultant was further extruded as a sheet with the t-die at a temperature of 270° C., and cooled while a mirror surface was transferred thereon with three mirror-finishing rolls at temperatures of 120° C., 130° C. and 190° C., respectively, from the upstream, thereby obtaining a laminate of the hard-hardness resin and the polycarbonate resin layer (base material layer). The thickness of the resulting laminate was 1.2 mm while the thickness of the high-hardness resin layer was 60 µm near the center.

A hard coat layer was formed in the same manner as Example 1.

Comparative Example 2: MS-H (Tg 115° C.)/S1000 (Tg 147° C.)/2 mmt

A resin sheet was prepared in the same manner as Comparative example 1 except that the discharge speed for extruding the polycarbonate resin with the single screw extruder was 83.0 kg/h, and the thickness of the laminate of the high-hardness resin layer and the polycarbonate resin layer (base material layer) was 1.2 mm (the thickness of the high-hardness resin layer was 60 µm near the center).

Comparative Example 3: MS-H (Tg 115° C.)/S1000 (Tg 147° C.)/3.5 mmt

A resin sheet was prepared in the same manner as Comparative example 1 except that the discharge speeds for extruding the high-hardness resin (B1) and the polycarbonate resin with the single screw extruders were 1.3 kg/h and 72.0 kg/h, respectively, and the thickness of the laminate of the high-hardness resin layer and the polycarbonate resin layer (base material layer) was 3.5 mm (the thickness of the high-hardness resin layer was 60 µm near the center).

Comparative Example 4: MS-H (Tg 115° C.)/S1000 (Tg 147° C.)/0.5 mmt

A resin sheet was prepared in the same manner as Comparative example 1 except that the discharge speeds for extruding the high-hardness resin (B1) and the polycarbonate resin with the single screw extruders were 4.8 kg/h and 35.0 kg/h, respectively, and the thickness of the laminate of the high-hardness resin layer and the polycarbonate resin layer (base material layer) was 0.5 mm (the thickness of the high-hardness resin layer was 60 µm near the center).

Comparative Example 5: PMMA (Tg 105° C.)/Low-Tg PC (Tg 125° C.)/0.8 mmt

A multilayer extrusion machine provided with a 32-mm-diameter single screw extruder, a 65-mm-diameter single screw extruder, a feedblock connected to each of the extruders and a t-die connected to the feedblock was used to mold a laminate comprising a base material layer and a high-hardness resin layer. Specifically, a high-hardness resin (an acrylic resin; Parapet HR-1000L (PMMA); manufactured by Kuraray Co. Ltd.) was continuously loaded into the 32-mm-diameter single screw extruder, and extruded under the conditions of a cylinder temperature of 250° C. and a discharge speed of 2.6 kg/h. In the meantime, a polycarbonate resin (Iupizeta T-1380; manufactured by Mitsubishi Gas Chemical) was continuously loaded into the 65-mm-diameter single screw extruder, and extruded under the conditions of a cylinder temperature of 240° C. and a discharge speed of 32.0 kg/h.

The extruded high-hardness resin and polycarbonate resin were loaded into the feedblock provided with 2-type 2-layer distribution pins to laminate the high-hardness resin and the polycarbonate resin at a temperature of 240° C. The resultant was further loaded into the t-die and extruded as a sheet at a temperature of 240° C., and cooled while a mirror surface was transferred thereon with three mirror-finishing rolls at temperatures of 110° C., 140° C. and 185° C., respectively, from the upstream, thereby obtaining a laminate of the hard-hardness resin and the polycarbonate resin layer (base material layer). The thickness of the resulting laminate was 0.8 mm while the thickness of the high-hardness resin layer was 60 µm near the center.

A hard coat layer was formed in the same manner as Example 1.

Comparative Example 6: FPC0220 (Tg 184° C.)/T1380 (125° C.)/1.2 mmt

A laminate of a base material layer and a high-hardness resin layer was molded using the same multilayer extrusion machine as Example 1. Specifically, a high-hardness resin (B5) (a polycarbonate resin represented by General formula (8); Iupizeta FPC0220 (manufactured by Mitsubishi Gas Chemical)) was continuously loaded into the 35-mm-diameter single screw extruder, and extruded under the conditions of a cylinder temperature of 300° C. and a discharge speed of 2.6 kg/h. In the meantime, a polycarbonate resin (Iupizeta T1380; manufactured by Mitsubishi Gas Chemical) was continuously loaded into the 65-mm-diameter single screw extruder, and extruded under the conditions of a cylinder temperature of 240° C. and a discharge speed of 50.0 kg/h.

The extruded high-hardness resin and polycarbonate resin were loaded into the feedblock provided with 2-type 2-layer distribution pins to laminate the high-hardness resin and the polycarbonate resin at a temperature of 280° C. The resultant was further extruded as a sheet with the t-die at a temperature of 280° C., and cooled while a mirror surface was transferred thereon with three mirror-finishing rolls at temperatures of 120° C., 130° C. and 190° C., respectively, from the upstream, thereby obtaining a laminate of the hard-hardness resin and the polycarbonate resin layer (base material layer). The thickness of the resulting laminate was 1.2 mm while the thickness of the high-hardness resin layer was 60 µm near the center.

A hard coat layer was formed in the same manner as Example 1.

Comparative Example 7: S-1000 (Tg 147° C.) Alone/2 mmt

A laminate was molded using, instead of a high-hardness resin, the same polycarbonate resin contained in the base material layer. The same multilayer extrusion machine as Example 1 was used. Specifically, a polycarbonate resin (Iupilon S-1000 (manufactured by Mitsubishi Engineering-Plastics Corporation); pencil hardness 3B) was continuously loaded into the 35-mm-diameter single screw extruder, and extruded under the conditions of a cylinder temperature of 280° C. and a discharge speed of 2.6 kg/h. In the meantime, the polycarbonate resin (Iupilon S-1000; manufactured by Mitsubishi Engineering-Plastics Corporation) was continuously loaded into the 65-mm-diameter single screw extruder, and extruded under the conditions of a cylinder temperature of 280° C. and a discharge speed of 83.0 kg/h.

The extruded polycarbonate resins described above were loaded into the feedblock provided with 2-type 2-layer distribution pins and laminated at a temperature of 280° C. The resultant was further loaded into the t-die at a temperature of 280° C. to be extruded as a sheet, and cooled while a mirror surface was transferred thereon with three mirror-finishing rolls at temperatures of 120° C., 130° C. and 190° C., respectively, from the upstream to give a laminate of the polycarbonate resins. The thickness of the resulting laminate was 2 mm.

A hard coat layer was formed in the same manner as Example 1.

The resin sheets produced in Examples and Comparative examples were evaluated for the hardness, presence of cracks after molding and presence of flow marks. The results are shown in Table 1 below.

TABLE 1

|  | Tg of high-hardness resin (TgB) (° C.) | Pencil hardness of high-hardness resin | Tg of polycarbonate resin (TgA) (° C.) | Difference in Tg (TgB−TgA) | Sheet thickness* (mm) | Pencil hardness of resin sheet | Cracks after molding | Flow marks |
|---|---|---|---|---|---|---|---|---|
| Example 1 | 124 | H | 125 | −1 | 1.2 | 2H | Absent | Absent |
| Example 2 | 124 | H | 125 | −1 | 2 | 2H | Absent | Absent |
| Example 3 | 124 | H | 125 | −1 | 0.5 | 2H | Absent | Absent |
| Example 4 | 124 | H | 125 | −1 | 3.5 | 2H | Absent | Absent |
| Example 5 | 141 | 2H | 125 | 16 | 2 | 3H | Absent | Absent |
| Example 6 | 141 | 2H | 147 | −6 | 2 | 3H | Absent | Absent |
| Example 7 | 120 | 2H | 125 | −5 | 1.5 | 3H | Absent | Absent |
| Example 8 | 126 | 2H | 125 | 1 | 2 | 3H | Absent | Absent |
| Example 9 | 118 | 3H | 125 | −7 | 2 | 4H | Absent | Absent |
| Example 10 | 123 | H | 125 | −2 | 1.2 | 3H | Absent | Absent |
| Example 11 | 141 | 2H | 125 | 16 | 0.5 | 3H | Absent | Absent |
| Example 12 | 184 | HB | 147 | 37 | 1.2 | 2H | Absent | Absent |
| Example 13 | 115 | 2H | 125 | −10 | 1.2 | 3H | Absent | Absent |
| Example 14 | 115 | 2H | 125 | −10 | 0.5 | 3H | Absent | Absent |
| Example 15 | 115 | 2H | 125 | −10 | 1.2 | 3H | Absent | Absent |
| Comparative example 1 | 115 | 2H | 147 | −32 | 1.2 | 3H | Present | Absent |
| Comparative example 2 | 115 | 2H | 147 | −32 | 2 | 3H | Present | Absent |
| Comparative example 3 | 115 | 2H | 147 | −32 | 3.5 | 3H | Present | Absent |
| Comparative example 4 | 115 | 2H | 147 | −32 | 0.5 | 3H | Present | Absent |
| Comparative example 5 | 105 | 3H | 125 | −20 | 0.8 | 3H | Present | Absent |
| Comparative example 6 | 184 | HB | 125 | 59 | 1.2 | 2H | Absent | Present |
| Comparative example 7 | — | — | 147 | — | 2 | HB | Absent | Absent |

"Sheet thickness" refers to the total thickness of the base material layer and the high-hardness resin layer.

The resin sheets of the examples were shown to have excellent hardness without flow marks or appearance abnormality such as cracks after thermoforming.

While some embodiments of the present invention were described, these embodiments are merely presented as examples and are not intended for limiting the scope of the invention. These novel embodiments may be carried out in other various forms, and variety of omission, replacement and modification are allowed without departing from the gist of the invention. These embodiments and their variations fall within the scope and the gist of the invention as well as within the scope of the inventions stated in the claims and equivalents thereof.

The invention claimed is:

1. A molding resin sheet comprising:
   a base material layer containing a polycarbonate resin (a1);
   a high-hardness resin layer containing a high-hardness resin; and
   a hard coat layer,
   wherein the high-hardness resin layer is placed between the base material layer and the hard coat layer,
   a pencil hardness of the high-hardness resin is HB or harder, and
   glass transition points of the polycarbonate resin (a1) and the high-hardness resin satisfy the following relationship:

−10° C.≤(Glass transition point of high-hardness resin)−(Glass transition point of polycarbonate resin (a1))≤40° C., wherein the content of the polycarbonate resin (a1) contained in the base material layer is 100 mass % of the total mass of the base material layer,
   wherein a pencil hardness of a surface of the hard coat layer is 2H to 4H,
   wherein the high-hardness resin is selected from the group consisting of resins (B2) and (B4):
   resin (B2): a copolymer (D) containing 6-77 mass % (meth)acrylic ester constituent unit, 15-71 mass % styrene constituent unit and 8-23 mass % unsaturated dicarboxylic acid constituent unit, an alloy of said copolymers (D), or an alloy of said copolymer (D) and other high-hardness resin; and resin (B4): a copolymer (G) containing 5-20 mass % styrene constituent unit, 60-90 mass % (meth)acrylic ester constituent unit and 5-20 mass % N-substituted maleimide constituent unit, or an alloy of said copolymer (G) and said resin (B2).

2. The molding resin sheet according to claim 1, wherein the polycarbonate resin (a1) is an aromatic polycarbonate resin.

3. The molding resin sheet according to claim 2, wherein the aromatic polycarbonate resin comprises a constituent unit represented by formula (4a) below:

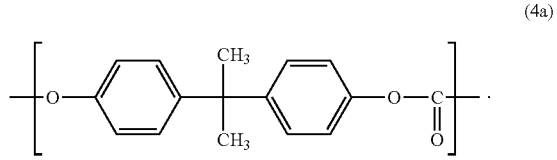

4. The molding resin sheet according to claim 1, wherein a content of the high-hardness resin is 70-100 mass % to a total mass of the high-hardness resin layer.

5. The molding resin sheet according to claim 1, wherein a total thickness of the base material layer and the high-hardness resin layer is 0.5 mm-3.5 mm.

6. The molding resin sheet according to claim 1, wherein a ratio of the thickness of the base material layer is 75%-99% to a total thickness of the base material layer and the high-hardness resin layer.

7. The molding resin sheet according to claim 1, wherein the hard coat layer is an acrylic hard coat.

8. A molded resin article molded using the molding resin sheet according to claim 1.

9. The molding resin sheet according to claim 1, wherein the high-hardness resin is resin (B2).

10. The molded resin sheet according to claim 1, wherein the high-hardness resin is resin (B4).

* * * * *